(12) United States Patent
Darby, III

(10) Patent No.: US 10,355,776 B2
(45) Date of Patent: *Jul. 16, 2019

(54) EXPERIMENTAL SMARTPHONE GROUND STATION GRID SYSTEM AND METHOD

(71) Applicant: University of Louisiana at Lafayette, Lafayette, LA (US)

(72) Inventor: Paul J. Darby, III, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,049

(22) Filed: May 1, 2018

(65) Prior Publication Data
US 2018/0309505 A1    Oct. 25, 2018

Related U.S. Application Data

(63) Continuation of application No. 15/493,519, filed on Apr. 21, 2017, now Pat. No. 9,991,949.

(51) Int. Cl.
| | |
|---|---|
| *H04W 4/00* | (2018.01) |
| *H04B 7/185* | (2006.01) |
| *H04W 24/08* | (2009.01) |
| *H04W 24/02* | (2009.01) |

(52) U.S. Cl.
CPC ..... *H04B 7/18517* (2013.01); *H04B 7/18515* (2013.01); *H04W 24/02* (2013.01); *H04W 24/08* (2013.01)

(58) Field of Classification Search
CPC .......... H04B 7/18517; H04B 7/18515; H04W 16/22; H04W 24/08; H04W 84/18
USPC .......................................... 455/430
See application file for complete search history.

(56) References Cited

U.S. PATENT DOCUMENTS 9,991,949 B2 *  6/2018  Darby, III .......... H04B 7/18517

* cited by examiner

*Primary Examiner* — Amancio Gonzalez
(74) *Attorney, Agent, or Firm* — Russel P. Primeaux; Jessica C. Engler; Kean Miller LLP

(57) ABSTRACT

This system and method provides for a plurality of satellite ground stations, distributed across some geographic region, and for these regions in turn to be scalable to cover large regions or even the globe using a combination of low-orbit satellites, terrestrial participant devices, and cloud-based communications. The invention in its simplest form is intended to solve the short temporal window problem inherent to the scenario where a single base or ground station is trying to track and communicate with a low-end LEOSAT or even a cube-satellite.

34 Claims, 5 Drawing Sheets

EXPERIMENTAL SMARTPHONE GROUND STATION GRID SYSTEM AND METHOD

CROSS REFERENCE TO RELATED APPLICATION

This application is a continuation of U.S. non-provisional application Ser. No. 15/493,519 filed on Apr. 21, 2017, which claims the benefit to U.S. Provisional Patent Application No. 62/325,675 entitled "Experimental Smartphone Ground Station Grid", filed on Apr. 21, 2016. The disclosures of the referenced application are hereby incorporated herein in their entirety by reference.

STATEMENT REGARDING FEDERALLY SPONSORED RESEARCH OR DEVELOPMENT

Not applicable.

REFERENCE TO A "SEQUENCE LISTING," A TABLE, OR COMPUTER PROGRAM

Not applicable.

DESCRIPTION OF THE DRAWINGS

The drawings constitute a part of this specification and include exemplary examples of the EXPERIMENTAL SMARTPHONE GROUND STATION GRID SYSTEM AND METHOD, which may take the form of multiple embodiments. It is to be understood that in some instances, various aspects of the invention may be shown exaggerated or enlarged to facilitate an understanding of the invention. Therefore, drawings may not be to scale.

FIELD OF THE INVENTION

Figure 1:
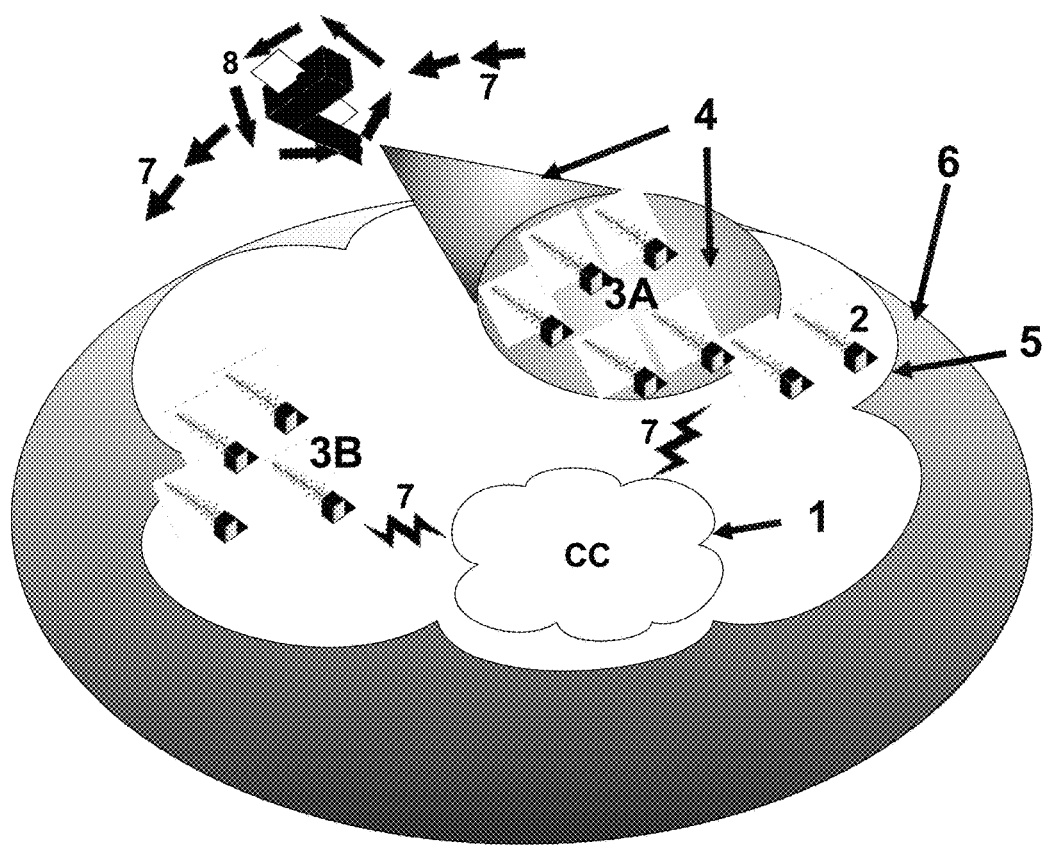
FIG. 1 shows a high-level rendering of the EXPERIMENTAL SMARTPHONE GROUND STATION GRID SYSTEM AND METHOD.
Figure 2:
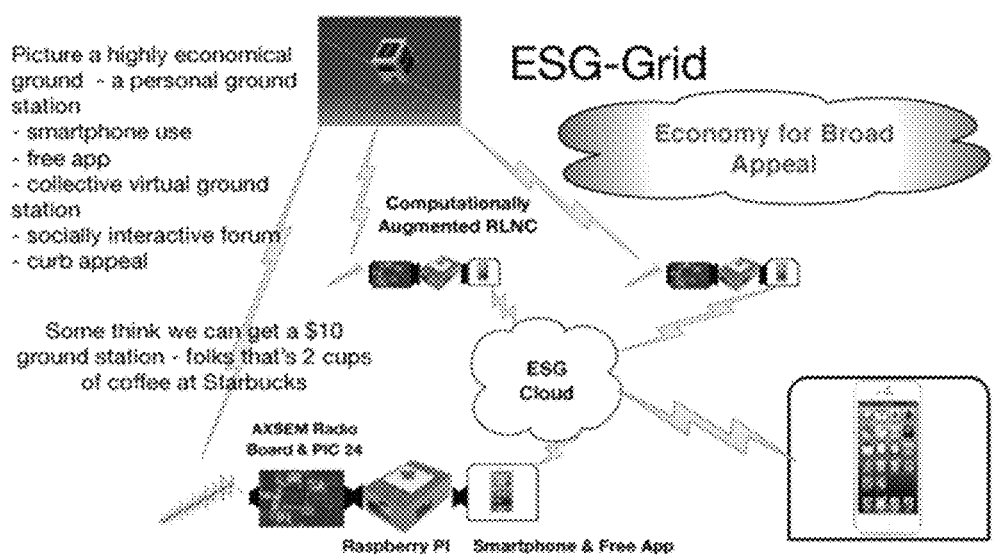
FIG. 2 depicts a representation of a personal ground station that can interact with a cubic satellite as part of the EXPERIMENTAL SMARTPHONE GROUND STATION GRID SYSTEM AND METHOD.

The present invention relates generally to the terrestrial-orbital network-systems and methods, involving and accommodating the use of Low Earth-Orbiting Satellites (LEOSATs), where the network-system and method employs programming of dynamic control, synchronization, feedback, prediction, and control adjustment, mechanisms so as to provide, novel capabilities, enhanced functionality and performance in the provision of dynamically adjustable Collaborative Integrated Services (CISs), i.e. services involving synchronized and dynamically adjusted and feedback-tuned combinations of communications, instrumentation, and/or actuation-control, among and through a networked plurality of geographically and/or spatially distributed terrestrial participating devices working in conjunction with one or more orbiting LEOSATs, all under control of the system's computational cloud, and more particularly to the same network-systems and methods for effecting globally scalable combinations of communications, instrumentation, and actuation-control Services among and through participant economical portable and/or mobile and self-mobile terrestrial devices (each capable of wirelessly communicating with the LEOSAT) working in conjunction with economical LEOSATs, such as cube-satellites, so as to provide a globally-scalable set of novel and enhanced coordinated Collaborative Integrated Services.

BACKGROUND OF THE INVENTION

To perform scientific, collaborative experimentation and exploration over any significantly large geographic or spatial domain, deploy a large number of field devices to provide sufficient resolution, or track a moving or dynamic phenomenon, or in cases where phenomena to be assessed are in remote areas and/or are rapidly changing, it is difficult and potentially infeasible using conventional methods. If feasible, the methods are prone to unreliable performance and overwhelming complexity.

Achieving a practical level of assurance that the scientific experimentation and exploration will be reliably achieved can be a complex, time-consuming, and expensive undertaking. Certain location like Antarctica, oceans, wetlands, deserts, rain forests, low-earth orbit, and hazardous areas can present their own unique challenges. The study of geographically widespread phenomena (e.g. climate change) presents the additional challenge of scalability to many conventional approaches. Further, certain circumstances, such as those involving data sensing and gathering in fragile ecosystems and wildlife habitats, are sensitive to human presence. Consequently, these environments require remote, economical, and widely scalable orchestrated control over experimentation and exploration, ensuring that the human footprint on the habitat can be minimized while achieving scalable resolution or the desired fault-tolerant redundancy.

Some experiments and explorations require numerous deployed sensing devices that are portable or mobile (or even self-mobile), providing sufficient resolution and the ability to track a moving, changing, and geographically widespread phenomena. The user may wish to change some parameter in on section of the geographic area while concurrently checking the change's effect in another section. Further, the user may want flexible and dynamic control over the functions and movement of field-deployed devices (e.g., to focus the location of field devices for higher spatial resolution in one small area), and, if those devices work in conjunction with a satellite, the user may also desire dynamic control over the functions, movement, and orientation of the satellite to enhance the degree of control in the experiment or exploration. Moreover, the user may wish to do on-orbit experiments or experiments that require a collaboration of satellite functions, movement, and orientation in conjunction with controlled function, movement, and orientation of each participating field-deployed device, synchronized for collaboration with the satellite functions, to conduct certain orchestrated and choreographed experiments in an interactive manner. These collaborative, orchestrated experiments offer new possibilities to science.

Military environments present their own unique challenges. The military theater often presents both a remote and hazardous environment, where information from the theater of battle and command and control over action taken in the battle theater is often complex and rapidly changing. Military decisions depend upon current, accurate information and must be quickly and decisively made. Higher quality and quantity of intelligence from the battle theater, including greater resolution and degree of coordination and control over the actions taken in the battle theater, are desirable.

First responders also have a need for high quality intelligence and information. Search and rescue during or after hazards or disasters present dangers to human first responders and others conducting search and rescue. Poor or inadequate information from or about the rescue area, a portion or all of which may be remote or effectively remote due to hazards, can contribute to loss of life or damage the environment or property. Further compounding the situation is that the normal communications systems, utilities and information-gathering services may be unavailable after a disaster, which may be widespread or in remote areas (e.g. an oil spill or fire in the Alaskan wilderness). These situations lend themselves to solutions providing remote orchestrated control over information and intelligence gathering, potentially over a widespread remote location, along with a greater degree of orchestrated command and control that is sufficiently robust in the face of the difficult environment.

In the transportation and homeland security arenas, sensing and monitoring factors affecting land, sea, air, and orbital traffic, and effecting adequate system and signaling control over transportation under both normal and hazardous conditions is a daunting challenge. Many locations do not have terrestrial transportation monitoring and control infrastructure in place, as it is expensive and requires years of planning. Compounding this is the reality that many areas where important transportation takes place are or can be remote (e.g. boats, ships or oil tankers out at sea, or transoceanic flights or automobiles traveling on remote highways or unmapped roads). In the case of agriculture, more efficient ways of monitoring and controlling agriculture to increase the productivity of limited land resources in the face of ever-increasing populations are needed.

Traditional satellites, costing millions of dollars, do not offer the desired degree of control over their functions (communications, instrumentation, and actuation-control), and their quantities are too small to offer the tremendous access needed by large populations of experimenters or those seeking to flexibly gather data through large arrays of sensors. While conventional satellites and ground stations are fine as a communications medium for high volumes of phone calls, data, and for other widespread instrumentation systems that are already operational, they cannot be easily or economically coopted for large volumes of coordinated research and development or complex scientific experiment.

Traditional ground stations have fundamental barriers which limit access to their use in Low Earth Orbiting Satellites ("LEOSAT") based experimentation. First, traditional ground stations using powerful computer servers, sophisticated multiband radios, and high-gain directional tracking antennas can cost thousands of dollars and are generally stationary. Second, traditional ground stations require significant knowledge to use and are hence not very transparent or easily or quickly deployed by students, experimenters, or untrained personnel. Third, traditional ground stations are few in number and are not easily deployed in large numbers on large geographic scales. Fourth, students and educators may not be familiar with ground stations. Fifth, the Short Temporal Window Problem with the Traditional Ground Station Approach exists and is known in the art. Finally, the requirement to have a ground station in order to participate in LEOSAT and/or cube-satellite based experimentation or operations is in itself a limitation.

Low Earth-Orbiting Satellites (LEOSATs), such as Cube-satellites, wherein one-unit cube-satellite may measure 10 cm×10 cm×10 cm, and weigh no more than 1.3 kg, are interesting to NASA, scientists, and amateur experimenters since they represent a very economical, volunteer enthusiast way of doing on-orbit experimentation, relative to commercial or government provided satellites for doing science and experimentation. Cube-satellites, because of their economy and small size, could easily be deployed in large numbers utilizing only a fraction of the launches and an even smaller fraction of the budget of more conventional satellite approaches. Further, the time from experimental concept to on orbit implementation tends to be much shorter in Cube-satellites than the conventional large-satellite approach to doing on-orbit science and experimentation. This being the case, it is nevertheless challenging to incorporate many of the functions and the functional performance of traditional satellites into the small inexpensive cube-satellite design. Certain functions (e.g. providing power for onboard systems, propulsion, stabilization, and orientation of the satellites while in orbit, and high performance and directional communications) are now fairly routine in traditional satellites, but become difficult to achieve in the economical cube-satellite approach. Cube-satellite performance is generally substandard as compared to conventional commercial and scientific satellites.

A salient difficulty in cube-satellites is the ability to achieve precise on-orbit stabilization and orientation (i.e. attitude control and hence control of its radio pattern direction). In any satellite, communications, computation, stabilization, the ability to orient the satellite, and the sophistication of the ground station are all interrelated. For example, the communications performance between ground station and satellite depends upon the ability to stabilize and orient the satellite so as to provide directional antenna aiming and gain directed at the ground station. But this precise orientation in cube-satellites is relatively difficult to achieve. This makes cube-satellite communications using the higher-gain dipoles or directional antennas particularly hard to achieve. In essence, it becomes hard to keep the cube-satellite antenna's major radio lobes pointed in the direction of the ground station. This is made all the more difficult as satellites are normally required to spin for thermal equalization on all surfaces. A particularly challenging problem is that the cube-satellite may spin somewhat erratically or tumble about at several RPMs once deployed. This means the satellite antenna's radio patter goes into and out of alignment with the ground station, causing deep period nulls in the radio strength, and radio alignment with the ground stations lasting for mere seconds in some cases. The deep nulls may interrupt the radio link between cube-satellite and a given ground station, and any portion of any messages in communication may be lost or the message may be dropped entirely.

Another issue limiting access to satellite-based experimentation using cube-satellite(s) and LEOSATs in general is the short temporal communications window, i.e. the short window of time available for communicating with the satellite during its flyover from the perspective of a given single ground station. This window, even under the best of circumstances, (i.e. under a good consistent signal for the entire window) is at most about 15 minutes as the LEOSAT or cube-satellite comes up over its approaching horizon, flies overhead and then goes down below its departing horizon.

Hence, using the traditional single ground station approach to LEOSAT and/or cube-satellite communications limits access to on-orbit experimentation in the case of LEOSATs and/or cube-satellites. The herein disclosed solution is to incorporate a plurality of inexpensive ground stations that can be portable or even mobile, and to network these ground stations together, synchronizing them with respect to when each ground station listens and when each ground station can speak. Scaling a network of this type globally or to any significant extent solves the small temporal window issue, since communications with the satellite is conducted through the collaborative action of many ground stations as opposed to just one or a few. In this scenario, communications can be broken up into short messages communicated through various ground stations to be recomposed centrally thus extending communications between ground and LEOSAT.

Further, Traditional ground stations designed for communicating with LEOSATs or cube-satellites normally include relatively expensive computer servers and relatively expensive, high-gain directional tracking antennas so as to attempt to maintain the communications link between ground and satellite during the satellite's 15 minute orbital overhead pass. They may cost hundreds or even thousands of dollars, are generally stationary, and require housing facilities. They are not readily scalable to large numbers of units, limiting broader access to low-end LEOSAT or cube-satellite communications or satellite-based experimentation.

What is presently unavailable in the art, which the disclosure herein provides includes the following thirteen features and benefits: (1) ability to broadly deploy sat-based operations (terrestrial, on orbit, or in combination) to very large geographic scales and to be capable of dynamically controlling this scale; (2) ability to substantially ramp up with respect to access time in sat-based terrestrial, on-orbit, or combined operations and to be capable of dynamically controlling that scale; (3) ability to substantially ramp up and scale in numbers of ground stations from just a few to many thousands of ground stations, and to be capable of quickly and economically field deploying these inexpensive ground stations; (4) ability to utilize a number of small, geographically dispersed, highly economical ground stations so as to achieve the performance of a single high-end or powerful ground station; (5) ability to support portable, mobile and self-mobile ground stations and to be able to remotely adjust ground station position, orientation, and ground station antenna orientation on these portable, mobile, and self-mobile ground stations; (6) ability to equip these portable, mobile, and self-mobile ground stations with sensors, instrumentation, and actuation (arms, motors, probes, mobile directional antennas, etc.) for use in experimentation, instrumentation, or operations endeavors; (7) ability to network the (scalable to thousands) plurality of these geographically distributed ground stations together, so commands can be sent to them from a centralized point, like a computational cloud, and so that data or satellite communications collected by the ground stations can be routed back to the central computational cloud, for access there by computer or smartphone for example, and for forwarded to any other ground station making up the plurality of ground stations; (8) ability to transparently and automatically support thousands of novel collaborative, orchestrated, and interactive, large-scale, terrestrial, on-orbit, or combined widely distributed stationary, portable, mobile or self-mobile experiments, explorations, and/or operations at an economical cost, while having the ability at the same time to quickly deploy same; (9) ability to utilize programming in the computational cloud and in the ground stations and satellite(s), in order to adjust and tune interactively, system communications, instrumentation, and command and control actuation among the cloud, the plurality of ground stations, and the LEOSAT(s) and/or cube-satellite(s); (10) ability to overcome the cube-satellite and LEOSAT stabilization and short temporal window limitations on communications and to achieve a practical level of packet data communications between the plurality of stationary, portable, mobile, and/or self-mobile ground stations and the satellite(s) making up the system through automatic, coordinated, and orchestrated communications control made possible by the interaction of communications, instrumentation, control actuation, and location and orientation functions among the plurality of ground stations and the LEOSAT/cube-satellite; (11) ability to use a smartphone with Internet access to automatically control a collaborative experiment, instrumentation function, or exploration or other operation anywhere on the Earth's surface and/or on orbit; (12) ability to combine and smartphone and inexpensive AXSEM radio board, and small antenna to form a highly economical base station; and (13) ability to achieve all of this economically while broadly expanding access. Accordingly, an economical, practical solution is desired, not only for reducing costs and capital expenses of providing such novel Collaborative Integrated Services (CISs), but also for improving the performance of certain communications, instrumentation, and/or actuation services already marginally available in the context of LEOSAT and/or cube-satellite-based communications, experimentation, exploration, and operations.

SUMMARY OF THE INVENTION

Disclosed herein is a method and device that can solve the short temporal window issue inherent in the scenario where a single base or ground station is trying to track and communicate with a low-end LEOSAT or cube satellite; however, this application is not limited to the communication and electronic devices closed. The invention disclosed herein is a cost-effective, globally and spatially scalable distributed control and packetized data network system and method, employing a controllable mix of centralized and distributed communications and control, with programming for distributed feedback and routing, prediction, tuning, and control-coordination and synchronization of the network's communication, instrumentation, and actuation functions singularly or in collaborative combination.

The invention comprises: (1) one or more LEOSATs (e.g. Cube-satellites); (2) an orchestrating-controlling computational cloud ("CC"); and (3) an interconnected (wirelessly or otherwise) plurality of geographically and spatially distributed "Terrestrial Participation Devices" (TPDs). A TPD may be comprised of (but not limited to) a smartphone-controlled hand-portable satellite base station or ground station. In one embodiment, the TPDs may be comprised of a stationary, portable, mobile, or self-mobile base station or ground station capability, including but not limited to automobiles, boats, planes, trains, drones, cruise missiles, tanks, jeeps, personnel back packs, or robots. The TPDS optionally can be capable of communicating with and receiving communications, control commands, and originated or relayed data from the CC via the Internet or other means. The TPDs optionally may communicate with, relay to, or receive originated or relayed communications or commands via radio from one or more LEOSATs.

One salient purpose of the system and method is to provide practical, orchestrated, coordinated, synchronized and tunable Collaborative Integrated Services ("CIS"); that is, a mix of: (1) communications; (2) instrumentation, and (3) actuation functions in the context of Low-end LEOSATs made possible through the use of distributed programming and the space-diverse strength of a plurality of TPDs acting collaboratively under the control of the CC and its programming. Another feature is the ability to dynamically adjust and tune communications, instrumentation, and actuation functional parameters interactively and interdependently through actuation, measurement, software analysis, prediction, and synchronized control of these interdependence CIS functions.

TPDs and LEOSATs comprising the system may be homogeneous or heterogeneous with respect to each other. The TPDs and LEOSATs can optionally include CC-controllable wireless, Internet, and radio communications, CC-controllable tools or other actuators (e.g., motors) and CC-controllable instrumentation and sensors capable of various measurements. With CIS, the network system and method utilizes CC-control over the communications, instrumentation, or actuation functions or parameters at each TPD and/or LEOSAT together with CC-controllable instrumentation and performance feedback from TPDs and/or LEOSATs, about communications, instrumentation, or actuation performance in the field to make performance predictions, adjust dynamically the instrumentation or functions, in order to provide enhanced performance and control.

The system and method is envisioned to support wider and more cost-effective access to LEOSAT supported experimentation, exploration, and orchestrated activities, which offers global scalability and modification in the number and mobility of TPDs to be deployed and managed during the activity.

DETAILED DESCRIPTION OF THE INVENTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner into one or more embodiments. In the following description, numerous specific details are provided, such as examples of apparatuses, mediums, frequencies, and application times. One skilled in the relevant art will recognize, however, that the disclosed system or method may be practiced without one or more of the specific details, or with other methods, components, materials, and so forth. In other instances, well-known structures, materials, or operations are not shown or described in detail to avoid obscuring aspects of the invention.

The invention solves the Short Temporal Window Problem inherent to the scenario where a single base or ground station is trying to track and communicate with a low-end LEOSAT or even a cube-satellite. In that scenario where for example, a cube-satellite may tumble about erratically causing deep radio nulls from the perspective of the ground station, temporal windows of mere seconds, or even fractions of a second, may be all that is afforded to the communications link between ground station and satellite. Under such situations, only fragments of the overall message to be communicated may get through in each single transmission burst. Even if the cube-satellite is not tumbling, and a solid link can be maintained between the tracking ground station and the cube-satellite, such that communications can be maintain as the satellite proceeds from horizon to horizon, from the prospective of the ground station, at most 15 minutes or so is allowed for communications. In certain orbits, only two good 15-minute passes and two not-so-good 15-minute passes of the satellite over the ground station area may occur per day. This situation is woefully inadequate from the perspective of scientists and experimenters who would like greater access to on-orbit experimentation in the context of cube-satellites.

To solve this short temporal window problem, the disclosed ESG-Grid provides for a plurality of satellite ground stations, distributed across some geographic region, and for these regions in turn to be scalable to cover large regions or even the globe. The ESG-Grid also provides for these ground stations to have network access, so that messages perhaps intercepted from the satellite at one location can be routed to the correct party intended to receive it. While other networks provide ways to network satellite ground stations, they tend to lack full experimental access to the satellites and ground stations, are not fully automatic (i.e. transparent operation) to users of the system, do not support the use of large numbers of very inexpensive portable and mobile ground stations, do not provide the degree of automated, orchestrated control over these to gain collaborative communications and other benefits, or do not support orchestrated coordination of the combination of communications, instrumentation, and actuation functions involving both the plurality of ground stations and potentially a plurality of satellites, termed Collaborative Integrated Services ("CIS"), as does the invention described herein.

The degree of transparency offered by the disclosed ESG-Grid is lacking in present technology. Transparency, in this context, means that a user can simply send communications, a long message, or a request for an orchestrated experiment, data gathering project or mission without being concerned with: the details of the orchestrating control commands being sent to ground stations and satellites; the data or communications routing, the communications fragmentations, coding, ground station or satellite locations and their orientations; the spatial or temporal locations of best satellite-ground communications links; or the temporal communications window or windows that may be present. Instead, with the ESG-Grid, when a user wants to initiate an action, the user may specify the desired action in one embodiment by smartphone application access to the ESG-Grid's network via Cloud computing access, and the ESG-Grid functionality allows for action specification either in the form of an experimental language or through a menu selection along with the service quality and timeline desired. The process is transparently interactive in that the ESG-Grid system will automatically determine whether it can provide the user's requested action based upon the ESG-Grid's system's available resources. For example, if an orchestrated experiment is requested by the user and the user's original requested service qualities cannot be provided, the ESG-Grid can interact with the user to scale back or provide alternative scenarios to the user. The user does not have to be aware or to be concerned about how or where the ESG-Grid will obtain or provide the communications, instrumentation, actuation, or computation resources needed unless the user specifically intends to be aware of this.

Construction of small inexpensive personal ground stations ("PGS") units is known in the art using inexpensive radio boards, inexpensive computers, a simple, small handheld antenna, and a smartphone software application operated on a smartphone to facilitate Computational Cloud synchronization of the PGS. The problem with the PGS stations is that singularly, they potentially provide little gain or ability to communicate with the LEOSAT or cube-satellite at very high bit rates, and they may not be able to keep the ground-satellite radio link going for more than a few seconds at a time. Hence singularly the PGS units may not be very practical for extensive LEOSAT or cube-satellite communications in support of extensive experimentation. But, when a plurality of PGS units are coordinated and synchronized under computational cloud control, which each communicate with the LEOSAT in turn, this approach becomes very powerful and supports a higher baud rate and greater temporal communications windows (i.e. extensions past the radio horizon) than individual, uncoordinated, unsynchronized ground stations alone can provide. The computational cloud link via the Internet with each PGS offers a multitude of strategic advantages with respect to new and enhanced communications, instrumentation, and actuation-control functions, in addition to better fault tolerance. An additional benefit is that with this PGS approach, massive and cost-effective scalability of large numbers of PGS units can be provided to cover large geographic regions and potentially even the entire globe.

By networking these PGSs, spreading them spatially over geographic regions, and using software orchestration and control over their transmission and reception intervals, the ESG-Grid forms a more powerful virtual ground station from the controlled plurality of PGSs. The ESG-Grid incorporates a computational cloud that interconnects via the Internet (for example), with the plurality of PGSs. Within the ESG-Grid, the computational cloud and its parallel computing capability may be used to quickly perform many parallel simulations and many various parallel calculations that allow it to quickly predict the LEOSAT's or cube-satellite's orbital location and orientation, at any given time, in advance of the satellite's orbital pass over a cluster of PGS units. Further, given that the ESG-Grid can also know the spatial location of each and every PGS unit on the ground, it can predetermine where each PGS is with respect to the passing satellite, and hence how (when and where) the satellite's antenna pattern (as it tumbles or otherwise) will best align with PGS units on the ground and which PGS units it will align with at what times. The ESG-Grid can then orchestrate which PGS units transmit to the satellite and which PGS units listen (i.e. arranging for certain PGS units with the best radio view of the satellite during a given time to communicate and for other PGS units to be silent) so as to minimize contention among the plurality PGS units when communicating with the satellite. This improves communications throughout by arranging parallel and time division multiplexed communications with the satellite among the PGS units, with each PGS unit so directed, communicating in short communicating bursts with the satellite and each PGS doing the same as it becomes best aligned with the satellite's antenna pattern projection on the ground.

Now, under the ESG-Grid system and method, each PGS unit will transmit or receive only a portion of the intended communications (message. Hence, a message transmitted from the satellite to ground may be broken up into fragments (under preceding instruction from the computational cloud), where it is intended that each fragment be received by a different PGS during different time intervals within the satellite's orbital flyover. In this scenario, said message fragments would be transparently (automatically) routed back from each receiving PGS, to the ESG-Grid's computational cloud for reassembly into the full message intended to be communicated by the satellite to the ground. Likewise, messages sent by smartphone or otherwise to the ESG-Grid's computational cloud, intended for transmission to the satellite, are fragmented by the computational cloud and transparently routed to or distributed among the PGS units best positioned to have a view of the satellite, with the greatest number of fragments or packets (destined for transmission to the satellite), apportioned to the PGS units having the longest predicted temporal communications windows with the satellite and the best radio view of the satellite. In this embodiment, the satellite would collect the various message fragments received from each PGS in turn and reassemble the full message or relay the fragments received to other PGS units in another ESG-Grid system for reassembly in the computational clouds of those systems.

Fragmentation of messages as a communications enhancement technique can be taken a step further, in that the messages can be divided into "M" equal length (byte wise) digital packets where said packets are linearly combined with each other through a process titled Random Linear Network Coding (RLNC) to produce "M" coded packets for transmission. Especially in the case of inferior radio links between ground stations and the satellite, as is the case with PGS units and the cube-satellite, the transmitted message fragments can and often do experience packet loss, termed "packet erasure". In such cases, the satellite or ground station may only receive a portion of the packets making up a message. Being a fountain code, RLNC provides enhancement to the fragmented message scenario, since the receiving device does not have to acknowledge each packet or to know which packets are missing from its received message; instead it just has to know that one or more packets are missing and wait until any "M" coded packets are received before determining the complete message via Gaussian Elimination, and then acknowledging that the message is complete. This is highly advantageous, since PGS units in the plurality of PGS units only transmit acknowledgements to the satellite after receipt of a complete message, potentially saving a large number of acknowledgements (i.e. number of acknowledgements per message X number of PGS units). Further, since the plurality of PGS units are networked to its cloud, the ESG-Grid can coordinate and choose which PGS unit to send the acknowledgement to the satellite, reducing the number of required acknowledgments taking up bandwidth and ensuring that the acknowledgment transmitted has the best chance of reaching the satellite. Likewise, PGS units waiting for acknowledgement from the satellite do not need to contend with an excess of received acknowledgments taking up the channel's available bandwidth as any PGS unit receiving an acknowledgment from the satellite can forward it to the ESG-Grid's computational cloud, increasing the chance of receiving the acknowledgment. An added benefit of the ESG-Grid, working in conjunction with RLNC is that any PGS who receives any packets making up a portion of the message, routes these back to the ESG-Grid's central cloud computer for reassembly. Then when the cloud receives the final missing packet of the message via any PGS reception from the satellite, it can choose a single or small number of PGS units best positioned to send the satellite an acknowledgment of message complete so that the satellite knows to stop transmitting.

Further benefit is derived when PGS units may directly or indirectly forward packets determined under RLNC to be linearly independent to each other, or innovative (containing new information). This way, the end receiving device, whether a PGS or a satellite, can see a substantial boost in the probability of receiving a completed message as the number of potential routes or combinations, by which all of the packets making up a message can be delivered to the destination (e.g. PGSa to PGSb to satellite, PGSa to PGSc to satellite, etc.), increase in accordance with the number of possible path combinations gained. This invention as described herein includes also further enhancements to the RLNC process to take advantage of the ESG-Grid's structure and method.

The satellite ground station and/or PGS may be generalized to take the form of any stationary, portable, mobile or self-mobile device(s) having the capability to do PGS functions (i.e. communicate with the LEOSAT and/or cube-satellite). Under this generalized description, these devices are generically referred to as a Terrestrial Participant Device (TPD). These TPDs include but are not limited to cars, trucks, trains, ships, boats, submarines, airplanes and gliders, and they optionally may be comprised of but not limited to robots, robotic vehicles, ballistics, balloons, kites, drones, missiles, cruise missiles, submersible probes, wearable body devices and body armor, battle tanks, and robotic remotely controllable versions of said devices. The plurality of TPDs forming the TPD portion of the ESG-Grid described herein optionally may be generalized to include homogeneous and/or heterogeneous mixes of the aforementioned described device forms. Nothing in this application should be interpreted to exclude other devices not specifically mentioned herein.

TPDs communications capabilities optionally may be augmented to include the capability of forwarding messages or message fragments or RLNC coded packets directly from one TPD to any other TPD(s) within radio range, using the either the same wireless radio channel used to communicate with the satellite or a different one. Under certain circumstances, some TPDs may have a good radio view of the satellite, but lack Internet or wireless connectivity back to the ESG-Grid's computational cloud, while other TPDs may have good wireless or Internet connectivity, but lack a good radio view of the satellite. The ability of a TPD to forward communications to other TPDs allows in many circumstances a number of ways in which a complete communications path between computational cloud and LEOSAT and/or cube-satellite can be achieved.

Said TPDs optionally may be augmented to be remotely controlled by the ESG-Grid's computational cloud through messages sent over the Internet directly via forwarding and/or via cellular or other wireless link. This includes remote control over any stationary, portable, mobile or self-mobile TPD. TPDs optionally may be augmented to include robotic arms and probes, mobile directional antenna(s) with directional control, and optionally may be equipped with a variety of sensors, or automated sensors, including but not limited to accelerometers, compass, gyroscope, Global Positioning (GPS), camera(s), microphone(s), tactile sensors, temperature sensors, salinity and moisture sensors, barometric pressure sensors, and other sensors or instruments. Moreover, TPDs optionally may be augmented, such that they are equipped with a variety of tools (e.g. including but not limited to wheels, tracks, arms, grabbers, legs, probes, guns, rocket launchers, and other actuators). The plurality of TPDs forming the TPD portion of the ESG-Grid described herein optionally may be generalized to include homogeneous and/or heterogeneous mixes of augmentations described herein. Hence TPDs, when generalized and augmented optionally may act as communicating, instrumentation, and/or actuation devices, with the communications parameters, instrumentation parameters, and actuation parameters of each TPD capable of being remotely controlled by the ESG-Grid's computational cloud. For example, a swarm of robots or cruise missiles (i.e. TPDs) could be controlled by the ESG-Grid and/or pre-programmed through the ESG-Grid, such that they are provided with certain location-dependent commands to control each of their directional antennas for communicating with a cube-satellite at a given flyover. At the same time their mobile paths could be controlled and instrumentation control commands could be sent to some on board air temperature or barometric pressure probes, such that the swarm acts as a composite instrument or actuation device tuned for communications appropriate to the situation at hand. For example, in the case where TPDs are small robots, only those robots where the ESG-Grid knows that robot battery capacity is sufficient may be asked to carry out a search for some phenomena in order to take instrumentation measurements, thus promoting global resource awareness and allocation in the ESG-Grid.

The LEOSAT portion of the ESG-Grid, described herein optionally may be generalized to include any plurality of LEOSATs and/or cube-satellites and any homogeneous and/or heterogeneous mix of these. The LEOSAT and/or cube-satellite portion of the ESG-Grid optionally may be augmented to include the capability of general control over the LEOSAT by the ESG-Grid's computational cloud, of communications, sensing/instrumentation, or actuation capabilities on board the LEOSAT and/or cube-satellite. The individual LEOSAT and/or cube-satellite described, optionally may be augmented to be controllably self-mobile or capable of self-actuation in orbit or elsewhere in space, and/or optionally be equipped with attitude control or not, and optionally may be equipped with directional antenna(s) with directional control capability and optionally may be equipped with switchable on/off directional antennas all under control of the ESG-Grid's computational cloud. The LEOSAT or cube-satellite may be augmented, such that it is capable of using a variety of sensors or automated sensors or instruments, whose parameters are controllable from the ESG-Grid's computational cloud, including but not limited to accelerometers, compass(es), microphone(s), thermometer(s), and other instrument payload(s) for sensing of phenomena in orbit, such as radiation, electromagnetic fields, light intensity, solar wind particles, x-rays, gamma rays, and other instrumentation. The LEOSAT or cube-satellite may be augmented such that it is capable of using a variety of tools, remotely controllable from the ESG-Grid's computational cloud, including but not limited to grabbers, probes, locomotion mechanisms, deployment mechanisms, propulsion mechanisms, et cetera.

The ESG-Grid's computational cloud is the hub or central piece of the ESG-Grid system and method. It is provided with functionality through hardware and software to carry out—in collaboration with the plurality of TPD(s) and one or more LEOSATs—the coordinated and orchestrated functions of the ESG-Grid, pertaining to communications, instrumentation, control-actuation and combinations of these termed Collaborative Integrated Services (CIS). CIS appropriate to support some higher mission (e.g. a collaborative experiment, exploration mission, or military operation) may be provided in the ESG-Grid.

In the preferred embodiment, the ESG-Grid's computational cloud (CC) is an Internet-based group of computer servers, all interconnected in the Internet and, via the Internet, connected to the plurality of TPDs out in the field. Since the ESG-Grid's CC can be comprised of a number of interconnected servers on the Internet, it is capable of performing potentially massive parallel computations involving calculations and simulations. It is also capable of distributing its control of the plurality of TPDs and, indirectly, its control over one or more LEOSATs. The ESG-Grid's functions include, but are not limited to: (1) Keeping track of the ephemeris (i.e. satellite orbital parameters and position description of one or more LEOSATs); (2) Keeping track of, among other data points, the planned routes, location, velocities, acceleration, instrumentation, actuation capabilities and tools, of each reporting stationary, portable, mobile or self-mobile TPD and LEOSAT, as well as the relative locations, velocities, accelerations, instrumentation, and actuation capabilities and tools with respect to each other; (3) Interfacing via the Internet to receive reports from TPDs or LEOSATs in the field comprising location, velocity, acceleration, instrumentation, actuation, and tools, from each reporting TPD in the plurality of TPDs and each LEOSAT making up the plurality of one or more LEOSATs; (4) Coordination and orchestration of the communications, instrumentation, and control actuation of TPD and LEOSAT units in the field, by communicating a time-slot based profile to these units corresponding usually with the LEOSAT's orbital flight over the ground stations, allowing the ESG-Grid's CC to provide CIS functional support for new and enhanced communications, instrumentation, control-actuation or Collaborative Integrated Services (CIS) functions (as a service in and of themselves, and as a support function for higher-level activities, e.g. collaborative experiments, operations, or missions); (5) Performing Multi-satellite Radio Path Prediction—the ESG-Grid's CC has functionality through programming or hardware to provide the prediction the antenna radio pattern projection on the Earth's surface in reference to ground station or TPD locations and orientations for each LEOSAT in the plurality of LEOSATs. Link budgets between each LEOSAT and each TPD on the ground are predicted in advance or in near real time, so as to determine and pick which links (i.e., LEOSAT-TPD) are best at what times during a LEOSAT flyover. While this approach has benefits with respect to achieving new and enhanced communication functionality, it can also be used to coordinate and orchestrate sensing/instrumentation functions and actuation (e.g. motion, re-orientation, use of tools, probes, etc.); (6) Performing automatic fragmentation of messages into fragments sizes or numbers of packets appropriate to the communications, instrumentation, or control actuation task at hand. Using its control over communications parameters at TPDs, and at LEOSATs, as well as its control over instrumentation and control-actuation, the ESG-Grid's CC can initiate a series of coordinated characterization or training experiments among groups of TPDs or LEOSATs, so as to determine and tune appropriate fragment sizes or numbers of packets for each TPD-TPD, TPD-LEOSAT, and LEOSAT-LEOSAT link. This optionally, may be determined or predicted a priori, or in nearly real time. It employs both instrumentation feedback to determine data or communications throughput, combined with adjustment of fragment size or numbers of packets so as to seek to optimize communications throughput; (7) Implementing Composite Orchestrated Instrument Functions—the mechanisms put in place to enhance communications between TPDs and TPD, between TPDs and LEOSATs, and between LEOSATs and LEOSATs, can also be employed in the operation of an orchestrated composite instrument. The time-slot profile can also specify which instrument functions are to be carried out by which TPDs and which LEOSATs during each time slot, e.g. perhaps activation of a probe to gather some data. The sensed data can then be routed back to the CC automatically (transparently) so as to be deposited in the account of the user who requested the composite instrument function be done. The sophistication here is highly configurable. For example, the battery capacity of various TPDs can be sensed and utilized by the CC to determine which TPDs among alternatives to put into action to do instrumentation functions (e.g. perhaps those with the best battery capacities (charge) who can be assured to complete the instrumentation function, as opposed to those who's battery capacities (charge) is low); (8) Employing Composite Orchestrated Control-Actuation—the mechanisms put in place to enhance communications between TPDs and TPD, between TPDs and LEOSATs, and between LEOSATs and LEOSATs, can also be employed in the operation of an orchestrated composite control-actuation. The time-slot profile can also specify which control actuation functions are to be carried out by which TPDs and which LEOSATs during each time slot (e.g. perhaps activation of locomotion or tools to do some exploration). For example, perhaps a swarm of robots can be put into action on an exploratory mission inside a failed nuclear power plant. There movements with feedback about their locations could be coordinated by the CC, automatically; and (9) Employing Collaborative Integrated Services (CIS)—the mechanisms put in place to enhance communications between TPDs and TPDs, between TPDs and LEOSATs, and between LEOSATs and LEOSATs, can also be employed in the provision Collaborative Integrated Services (CIS). CIS requires the CC to orchestrate collaboration between TPDs and TPDs, between TPDs and LEOSATs, between LEOSATs and LEOSATs, and between the CC itself and TPDs and LEOSATs, with respect to their time-slot based profiles for communications, instrumentation, and control-actuation. Communications, Instrumentation and Control-Actuation functions are interdependent and the adjustment of one potentially affects the other two, e.g. adjustment of instrumentation functions, may affect the ability to achieve certain communications or actuation functions to the desired performance levels. CIS as provided under orchestration by the CC is not only a service in itself, but moreover, CIS services may be provided and adjusted in real time or nearly real time so as to support the goals and quality of service requirements of higher-level functions (e.g. collaborative orchestrated science experiments, exploration missions, and or coordinated operations).

The ESG-Grid's computational cloud optionally may split into one or more CC, where each CC for a time may initiate its own communications with one set of LEOSAT in one part of the globe, while the other CC may coordinate some action with its TPDs and other LEOSATs in some other part of the globe. The later, the CCs may combine again so as to collaborate and share information to be used in some subsequent experiment or mission. All of this optionally may be coordinated automatically. Distributed computational clouds allows for parallel and independent more rapid orchestration of separate activities whose results can be combined later.

The Preferred Embodiment of the Disclosed ESG-Grid

The preferred embodiment of the present invention as shown in FIG. 1, is the ESG-Grid, comprising: A terrestrially distributed digital network system and method, for orchestrated and coordinated control of ground to satellite, satellite, to ground, and ground-to-ground communications comprising: at least one Terrestrial Participant Devices (TPDs) 2, and a Low Earth Orbiting satellite (LEOSAT) 3, wherein orchestration and coordination of communications between said TPD(s) 2 and said LEOSAT 3 and optionally between said TPD(s) 2 and TPD(s) 2, is controlled through functionality and programming comprised within said system's Computational Cloud (CC) 1, which is interconnected to said TPDs via the Internet 5. Further comprising said system is one or more or a plurality of said TPD(s) 2, geographically distributed on the Earth's surface 6 and potentially clustered in geographical areas 3A, 3B, wherein said TPD(s) 2 are interconnected to the system's CC 1 via the Internet 5, by wired or wireless access 7, to facilitate both TPD(s) 2 to TPD(s) 2 communications routing, TPD(s) 2 to CC 1 responses, acknowledgements and communications updates, and CC 1 to TPD(s) 2 communications and control commands to effect coordinated and orchestrated control of TPD(s) 2 communications with said LEOSAT 3 and optionally coordinated control of communications from TPD(s) 2 to TPD(s) 2. Within said system and method, "communications" refers to simple or complex Commands or Requests or Messages that optionally may originate or be forwarded from one or more TPD(s), or from said CC, or from said LEOSAT, wherein said communications is optionally triggered directly or indirectly by automatic or user or user-manager action from and within the CC, or from any authorized TPD(s) within the system, having connection with said CC, and under coordination and control by said CC. Within said system and method, and under orchestration and coordination from said CC, said CC optionally may forward communications to TPD(s), TPD(s) optionally may forward communications to said CC or said LEOSAT, and said LEOSAT optionally may forward communications to said TPD(s).

Basic TPD Description: The preferred embodiment of the ESG-Grid system and method can be further comprised of functionality such that the plurality of TPD(s) optionally may be homogeneous or heterogeneous, and are capable of being comprised of, but not limited to stationary or portable satellite base stations, satellite ground stations, or even inexpensive personal ground stations (PGSs), which optionally may be comprised of small computers or smart phones, and radios, wherein said TPD is capable of wired or wireless Internet access, and hence access to said CC for communications to said CC and for receiving communications from said CC via the Internet, and wherein said TPD is capable of radio or other wireless communications to said LEOSAT and also of receiving radio or other wireless communications from said LEOSAT under orchestrated control by said CC. Each TPD's radios or wireless communications subsystems are further comprised such that said TPD is able to perform wireless or radio signal measurement on radio signals received from said LEOSAT or from other TPD(s), or to record or keep track of received radio signal power, packet counts and bit error counts associated with received transmissions from said LEOSAT, or other TPD(s) and to store and time-stamp these measurements for communications back to said CC.

Basic LEOSAT Description: The preferred embodiment of the ESG-Grid system and method can be further comprised of functionality such that said LEOSAT 3 is comprised of a low earth orbiting commercial-business, or a non-commercial research or experimental satellite (e.g., a typical LEOSAT leased commercial satellite or a Cube or Nano-satellite (CubeSat)) capable of computing, and or bidirectional and broadcast radio or of other wireless communications with said TPD(s) 2 on the ground (Earth's surface). The basic LEOSAT 3 described in this one embodiment is further comprised of a low-end, low-cost LEOSAT (e.g. a low-end leased commercial satellite, or even an experimental LEOSAT such as a cube-satellite) which may be equipped with stabilization or attitude control or whose radio parameters or other satellite parameters may be under direct control of said ESG-Grid system. In the context of said system and method within this embodiment, said LEOSAT functions only to receive or forward, or to receive, store, and then forward communications it receives from said TPD(s). Otherwise it is not assumed to be under control of said ESG-Grid system. In this context, it is merely an available component of said system with receive, store, and forward capability to be leased or freely exploited by said system and method.

General Temporal-Spatial Coordination of TPDs: The preferred embodiment of the ESG-Grid system and method can be further comprised of functionality such that, because said LEOSAT may not be equipped with stabilization or attitude control, in combination with any accidental or induced spin about any axis of said LEOSAT, the radio receive footprint 4 may move about or rotate about as the satellite erratically spins or tumbles, in an apparently erratic movement, making it difficult to determine what points on the Earth's surface will be best for TPD(s) communications with the LEOSAT during the LEOSAT's orbital fly-over pass. This potentially renders any uncoordinated TPD(s) (that may be in standalone mode, without cloud (CC) coordination) unable to determine when said satellite's antenna pattern will align best with its TPD ground position, potentially rendering communications with said LEOSAT poor or non-existent. Hence a portion of said system and method is further comprised of programming and functionality such that temporal-spatial coordination and control of TPD(s) is provided to facilitate communications as defined and described herein.

General Temporal-Spatial Antenna Pattern Alignment Prediction of, and More Specifics on Temporal-Spatial Coordination of TPD(s): The preferred embodiment of the ESG-Grid system and method can be is further comprised of functionality such that said LEOSAT's radio antenna pattern spatial-temporal alignment with TPD(s), wherein TPD(s) are located at given arbitrary locations on the Earth's surface, in or near said LEOSAT's orbital projection, is predicted practically in advance, manually, or automatically within said CC via CC programming and functionality. This alignment prediction allows each of the TPD's communication parameters to be controlled, tuned, or optimized through said CC's exercised control, coordination, and synchronization of the TPD, taking advantage of said predicted spatial-temporal TPD(s)-LEOSAT radio pattern alignments that occur naturally or otherwise as said LEOSAT passes overhead. Here it is noted that, due to the satellite spin and translation, alignment of said LEOSAT's radio signal footprint with TPD(s) will occur at different points in time for differently located TPDs as the satellite passes overhead or even adjacently nearby. Said CC will coordinate with TPD(s) to issue potentially differing controlling operational communication parameters to each TPD, with the actual controlling communications parameters issued depending upon a number of optional software configurable factors, including, but not limited to location and including but not limited to the optimization goals for CC-TPD, TPD(s)-LEOSAT, and CC-TPD(s)-LEOSAT communications.

Time Slot Based Coordination: The preferred embodiment of the present invention can be further comprised of functionality such that a time-slot scheme is used by said system and method to temporally and spatially subdivide said LEOSAT's orbital pass over a given arbitrary geographical area containing TPDs (e.g. with, but not limited to stationary or portable inexpensive satellite ground stations serving as TPDs). Said CC then issues controlling parameters to each TPD on a time-slot basis (either singularly by TPD or collectively to groups of TPDs). The CC's issuance of controlling parameters on a time-slot-by-time-slot basis (i.e. communication parameters, and instrumentation-measurements parameters, or otherwise), potentially unique to each TPD for the duration of the satellite's orbital pass (or extending beyond said orbital pass to future orbital passes), is termed the TPD's Issued Temporal Control, Communications and Instrumentation Profile ("ITCCIP").

Configurable Radio and Method of RCP and IMP Parameters Configuration: The preferred embodiment of the present invention can be further comprised of functionality such that said TPD is further comprised of a subcomponent (i.e. a radio) capable of being computationally configured or commanded in real-time or nearly real-time directly or indirectly by said CC, for half-duplex or full duplex digital or analog communications with said LEOSAT. All or portions of the plurality of TPD's radios optionally communicate over the same radio frequency or all or portions of the plurality of TPD's radios optionally communicate over separate or even unique frequencies (i.e. a unique frequency for each TPD radio chosen from a finite set or even chosen from a continuous range of frequencies). When any one TPD radio unit or LEOSAT transmits, and depending upon the transmit frequency and power as well as other communication parameters, all or a portion of the plurality of TPDs or the LEOSAT within range of the radio signal will optionally be capable of receiving said transmission, in one to one, one to many, or many to many communications. Within said ESG-Grid its ITCIP is further comprised of issued or present Radio Communications Parameters ("RCP"s) and basic Instrumentation Measurement Parameters ("IMP"s) to be followed on a time-slot basis by each TPD so instructed by said CC, under control or command of real-time or nearly real-time, or even a priori configuration through CC-TPD coordination and configuration of each of the said TPD's radios or its radio's onboard controlling computer.

Enumeration of RCP Parameters: The preferred embodiment of the present invention can be further comprised of functionality such that said RCPs, established by said CC, for each time slot and each TPD, are enumerated here to be comprised of, but are not limited to: transmit power; transmit frequency or Doppler profile; transmit baud rate and bit rate; transmit modulation scheme; temporal transmit window; transmit-listen duty cycle; transmit simulcast coordination; transmit activation and deactivation; transmit coding scheme; transmit spectral power specification; choice of transmit message or message portion to transmit; receive activation and deactivation; receive-listening duty cycle; receive temporal listening window; receive-listen transmit duty cycle; listening or receive frequency or Doppler profile; listening or receive gain; receive-listening decoding scheme; receive-listening spectral emphasis or equalization; receive baud rate and bit rate; and choice or message or message portion to receive; as well as other optional communication parameters.

Enumeration of IMP Parameters: The preferred embodiment of the ESG-Grid system and method can be further comprised of functionality such that said IMPs, established by said CC, for each time slot and each TPD are comprised of commands to TPD(s)' radios to perform received wireless or radio signal measurements or to record or keep track of received radio packet counts or bit error counts or received radio signal power levels on received radio transmissions from said LEOSAT or from other TPD(s), and to store and time-stamp these or other measurements. TPD(s) optionally may be commanded by said CC to relay such measurements, as commanded by IMPs, to said CC to be used in analysis or decision making as to appropriated RCP or other commands to be issued by said CC subsequently to TPDs.

Additional Specifications of the ITCCIP Functions and Benefits—RCPs and IMPs Coordination Capabilities and Options: The preferred embodiment can be further comprised of functionality such that RCP and IMP parameters can be issued uniquely or in combination to each TPD or to groups of TPDs, via CC-TPD coordination, and uniquely or otherwise for each time slot in advance or during time slots associated with a satellite orbital pass or for future passes, so as to configure said TPD(s) each for their appropriate communication or instrumentation profile over the series of said time slots (i.e. ITCCIP instructions during or in advance of said LEOSAT's orbital pass over said TPD ground locations). For example, in an alternative embodiment, the system and method is further comprised of functionality such that optionally control signals or data communications parameters (RCPs) are sent to each TPD from said CC to control which TPD transmits and which TPD listens during each time slot, so as to effect communications with said LEOSAT from the TPD or TPDs having the best radio-view of the satellite during said given time slot, whilst at the same time minimizing contention for TPD(s) to LEOSAT radio channel or channels, having limited bandwidth. Having certain TPD(s) transmit and certain TPD(s) listen in a coordinated manner during a given time slot, ensures that interfering contention in the face of a plurality of TPDs, for the available radio channel is minimized. It also ensures that said radio channel bandwidth is reserved for those TPDs having the best view or chance of communicating with said LEOSAT. Said system and method is further comprised such that other communications parameters (RCPs) and instrumentation measurement configurations (IMPs) can likewise be configured into each TPD for each time slot so as to enhance communications and measurement/prediction, in accordance with desired communications and measurement goals, (i.e. between CC and TPD(s), between TPD(s) and TPD(s), and between TPD(s) and the LEOSAT, and between CC, TPD(s) and LEOSAT in combination).

Computational Cloud: The preferred embodiment is further comprised of functionality within the CC, such that the CC is further comprised of programming and functionality wherein it acts as the centralized coordination and control subsystem for said ESG-Grid system and method. In one embodiment, said CC is comprised of Internet-based computing facilities capable of being configured with or running software or hardware designed to facilitate primary ESG-Grid functionality and coordination with and synchronization with said TPD units, either singularly or collectively. All ESG-Grid cloud (i.e. CC functionality) is provided within said CC via software or hardware-based (programs), further comprised of functional, additive, configurable, and selfconfigurable software modules or programs designed to run as software or firmware or on hardware on Internet Cloud computing facilities. The following subsections describes said ESG-Grid's Computational Cloud functionality, however implemented in or on said Internet-based CC and optionally not limited to these described functions.

Modular Overview of Computational Cloud: The CC of the preferred embodiment further comprises functionality such that several distinct modular functions are contained within said CC, including Module 1 (the Ephemeris Software Module), Module 2 (the PGS Registry Module or the TPD Registry Module), Module 3 (the PGS Communications Profile Planning Software Module or the TPD Communications Profile Planning Software Module), Module 4 (the Internet Communications Software Module), Module 5, (the Multi-satellite Radio Path Predictor Module), Module 6 (the Message/PGS Apportionment Module or the Message/TPD Apportionment Module), Module 7 (the Composite pre-tuned Instrument Module), and Module 8 (the Mobile Control Module. Within this embodiment, any modular grouping of the functions described herein, or any modular apportionment of the functions described herein, that achieves functionality as described herein, however modularly grouped or apportioned, is also hereby included in this embodiment.

Figure 3:
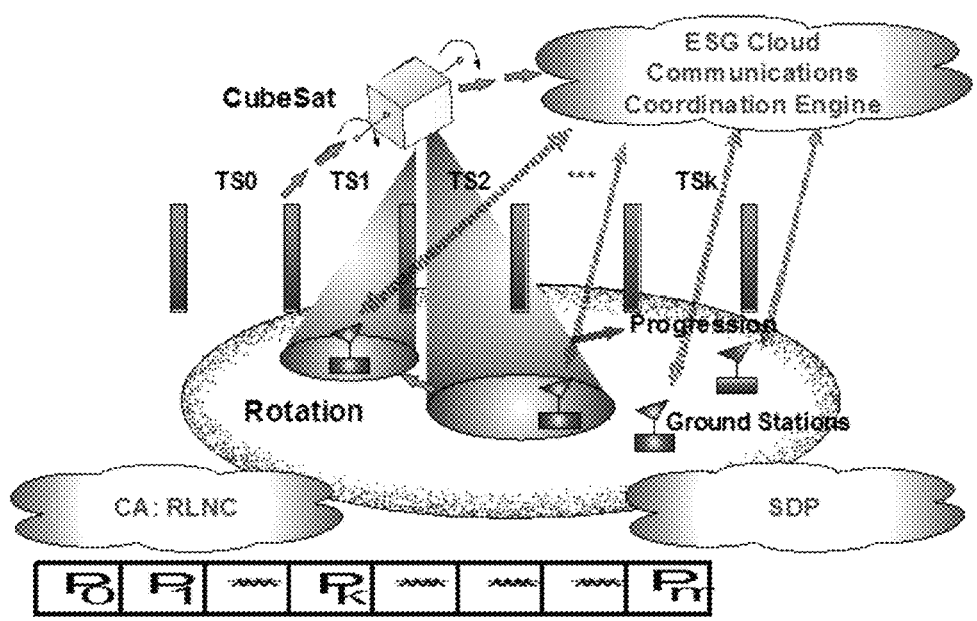
FIG. 3 demonstrates the time slot coordination scheme for the EXPERIMENTAL SMARTPHONE GROUND STATION GRID SYSTEM AND METHOD.
Figure 4:
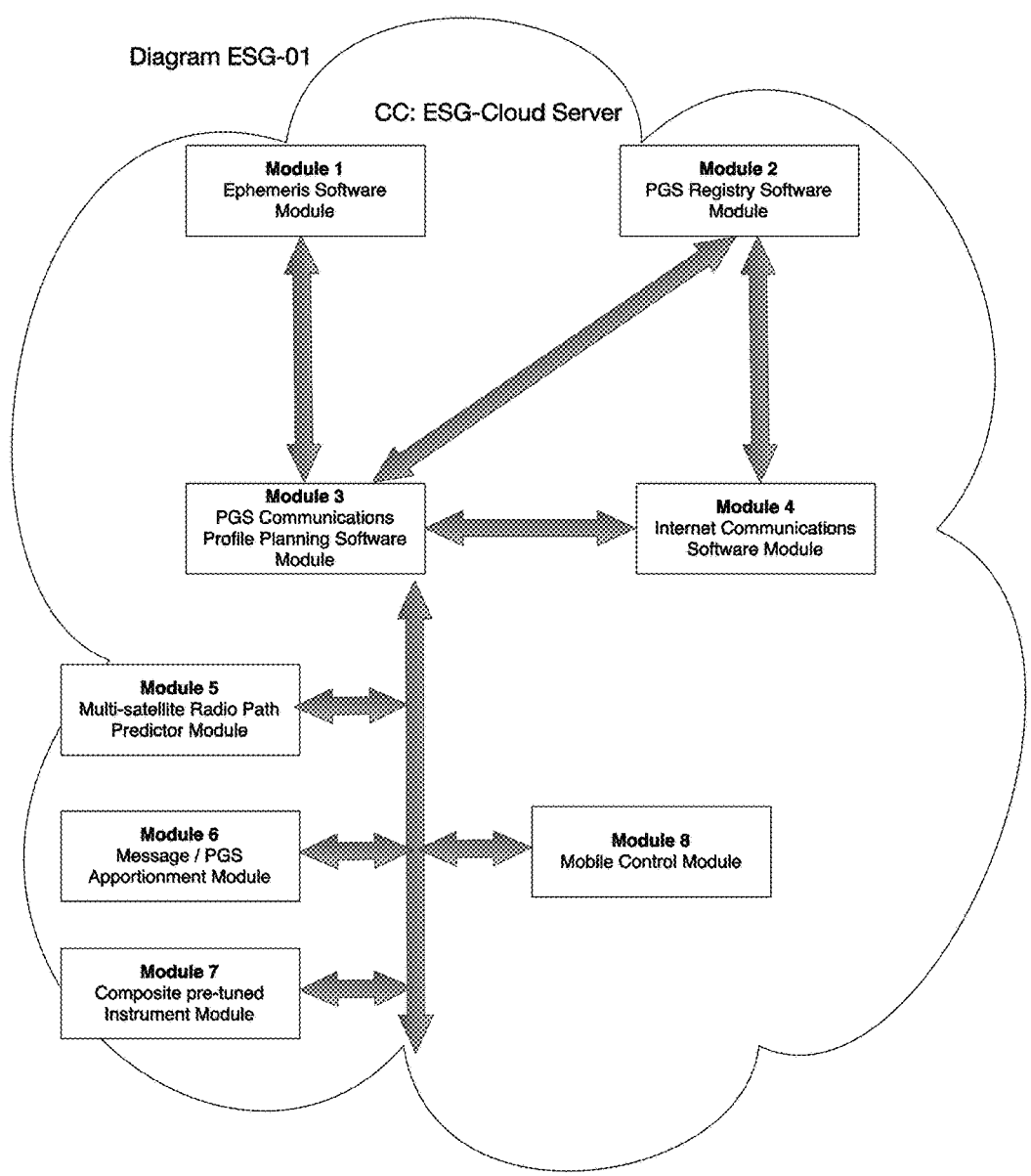
FIG. 4 depicts the functional modules for the EXPERIMENTAL SMARTPHONE GROUND STATION GRID SYSTEM AND METHOD's computational cloud.

Function of CC Module 1: The CC of the preferred embodiment further comprises functionality such that said CC's Module 1 is comprised of programming and functionality that contains a database containing a priori manually or automatically calculated and stored data as to said LEOSAT's predicted orbital position, or ephemeris, with respect to time and relative-to-known geographic locations prior to or during each overhead orbital pass of said LEOSAT. Said database is optionally capable of being updated automatically from said LEOSAT or from TPD(s) or from other automatic ground station locator sources. As shown in FIG. 3, Module 1 communicates with Module 3 to provide its LEOSAT location and predicted LEOSAT location data to Module 3.

Function of CC Module 2: The CC of the preferred embodiment further comprises functionality such that said CC's Module 2 is comprised of programming and functionality allowing it to serve as a manually or automatically entered or developed TPD data registry or data base containing the geographic coordinates for the a priori known, or automatically determined stationary location of each of the said TPD(s) participating in said ESG-Grid. Where TPD(s) are further comprised of sub-functions to provide Global Positioning Coordinates (GPS), or where said GPS coordinates may be manually or automatically stored at said TPD(s), said TPD(s) report to said Module 2 over the Internet, accessing Module 2 via Module 4, wherein Module 4 serves as the CC's Internet Interfacing Module. Said Module 2 optionally may have all of the ESG-Grid's participating TPD's locations manually or automatically stored via automatic or manual TPD report. As shown in FIG. 3, Module 2 communicates with Module 4, where Module 4 serves as the Internet interface function between Module 2 and said singular or plural TPD(s) having Internet connectivity with Module 4. Further, said Module 2 communicates with Module 3 to provide its registry data and TPD location data to Module 3 (i.e. that information describing the stationary geographic location of each of the TPD(s) participating in said ESG-Grid). The term stationary is defined to mean that said TPD unit(s) do not substantially move with respect to their GPS coordinates during said LEOSAT's orbital pass and that said coordinates determined at the beginning of the pass may be assumed by said system to remain in effect for the entire orbital pass of said LEOSAT.

Function of CC Module 3: The CC of the preferred embodiment further comprises functionality such that said CC's Module 3 is comprised of programming and functionality allowing it to operate as a central coordination and communications module within said ESG-Grid's CC. Capable of communicating with any one and all said modules and of relaying information or communications between any and all said modules, it functionally divides said LEOSAT's orbital pass over a given geographical area containing TPD(s), temporally and spatially, into an appropriate number of time slots depending upon the desired temporal-spatial resolution and determines and communicates RCPs and IMPs as appropriate uniquely for each TPD-time slot combination prior to or during said LEOSAT's orbital pass over the geographic area containing said TPD(s). Time slots, with a controllable duration, allow a controlled number and fewer data reads from said Modules 1 and 2, to get satellite ephemeris and TPD(s) location data respectively, fewer data reads from TPD(s), and a controlled number and fewer trigger commands (i.e. sent so as to configure communications and instrumentation parameters, respectively RCPs and IMPs). Hence, Module 3 provides the temporally-slotted RCP and IMP configurations or commands, as desired or appropriate, to each of the TPDs participating in said ESG-Grid with the routing assistance of Module 4. Module 3 is further comprised of functionality such that it communicates with Module 1 and Module 2 to get satellite ephemeris data and TPD(s) location data respectively. Module 3 is further comprised of functionality such that it coordinates with said Modules 5, 6, 7, and 8 as needed according to the modular functions comprising these respective modules. Module 3 is further comprised of functionality allowing it to coordinate with said Module 5 to send time-stamped radio signal levels and other measurement data obtained from TPDs under IMP control (as routed via Module 4) to Module 5, request that Module 5 perform predictive analysis on the data, and to coordinate with Module 5 to receive Module 5's predictive results (i.e. the SRPSTPs). Said Module 3 then utilizes the SRPSTPs provided to it by said Module 5, the ephemeris data provided to it by said Module 1, and the TPD registry location data, provided to it by said Module 2, so as to determine the appropriate RCPs and IMPs and their applicable time slots, for configuring of TPD(s) downrange along or near said LEOSAT's orbital pass. Said Module 3 is further comprised of functionality such that programmed factors such as, but not limited to, TPD-LEOSAT radio antenna pattern predicted alignment time, strength of alignment, and alignment duration, LEOSAT-TPD relative velocity vector, LEOSAT-TPD relative acceleration vector, LEOSAT predicted path, rotation, and antenna pattern, and predicted relative location and orientation between LEOSAT and each TPD(s), optionally may be used and analyzed by said Module 3, in order to appropriately assess and choose which RCPs and IMPs to assign to which and each TPD for configuration during each given time slot within said LEOSAT's orbital pass.

Function of CC Module 4: The CC of the preferred embodiment further comprises functionality such that said CC's Module 4 is comprised of programming and functionality such that it facilitates all Internet communications between said Module 3 and any given TPD in the plurality of TPDs, singularly or collectively. One function of said Module 4 is to relay or coordinate both the transmission of communications and control data packets to TPD(s) singularly or collectively over the Internet, to hand out said communications profiles and to distribute message data to TPDs either singularly or collectively to facilitate the TPD(s) coordinated time-slot based transmission of said messages to said LEOSAT. Said Module 4 is also comprised of functionality allowing it to receive data communicated from TPD(s), i.e. generated by the TPD(s) themselves, or TPD-relayed via LEOSAT, control or communications data to Module 2 (for TPD registry data) and Module 3 generally. Said Module 4 is further comprised of functionality to ensure location and registry data, collected from TPDs in said ESG-Grid's network, is routed or relayed to Module 2. Further, Module 4 is further comprised of functionality to ensure that Module 3's transmission of control (e.g. RCPs and IMPs) and communications messages get routed to the appropriate TPD(s), and also to ensure control responses and communications messages from TPD(s) get routed to back to said Module 3.

Additional Function of CC Module 3: The CC of the preferred embodiment further comprises functionality such that said CC's Module 3 is further comprised of programming and functionality such that it coordinates via Module 4 with TPD(s), such that said TPD(s) are configured by time slot in accordance with said Module 3's coordinated and assigned IMPs, to report their time-stamped actual measurements of receive radio signal level or strength or other measurements, as TPD's radios receive communications from said LEOSAT or from other TPD(s). Then, said TPD(s) in response, send their actual measurement data via Internet, either directly or upon request, as desired by ESG-Grid system operators or operator programming configuration, back via said Module 4 in said ESG-Grid cloud (CC), which then forwards said actual measurement data, along with measurement conditions (e.g. geographical location, relative LEOSAT location and actual ephemeris data) to said Module 5, which is further capable of analyzing said actual measurement data by comparing it to simulated predictions of said actual measurement data developed under control of Module 5.

Function of CC Module 5: The CC of the preferred embodiment further comprises functionality such that said CC's Module 5 is further comprised of programming and functionality to store and contain a three dimensional (3D) data representation of said LEOSAT's static radio antenna pattern, where such pattern may be determined manually or otherwise determined or deduced prior to or subsequent to said LEOSAT's launch. Using said static 3D radio pattern, said Module 5 is further comprised of program functionality allowing it to predict at some time t2, how said LEOSAT's 3D radio antenna pattern projection (footprint) will impinge upon the Earth's surface and at what geographical locations and times it will do so, as said LEOSAT and its 3D antenna pattern, spins or tumbles about and progresses or translates along its orbital pass or path. The purpose of said prediction is to allow said ESG-Grid, CC, via Module 5 to assist Module 3 to determine and communicate appropriate RCPs and IMPs to each of the TPDs downrange of said LEOSAT's orbital pass. In essence, TPD(s)-LEOSAT communications downrange or in the current range, benefit from analysis and prediction based upon actual measurement data collected by TPD(s) in the current range, or up range, respectively, under said LEOSAT's orbital projection. For example, appropriate RCP commands telling each TPD when to transmit and when to listen with respect to each time slot, can be sent to each TPD in or near the LEOSAT's orbital path projection on the Earth's surface, by said Module 3 via Module 4's Internet interface with TPD(s), effecting TPD communications with said LEOSAT precisely at times when the satellite's radio antenna pattern projection is predicted to impinge upon the TPD's geographic area. This way only the TPDs having the best radio view of the satellite at any given time will be enabled to transmit, listen, or take measurements, as appropriate, in an orchestrated and coordinated manner. This way also preserves efficient use of said LEOSAT's frequency (channel) bandwidth, which optionally, may be used by all TPDs and said LEOSAT. Hence, Module 5 essentially gets measurement data from TPD(s) up-range or alternatively in current-range along said LEOSAT's pass or near its pass projection and then analytically processes said data according to a manual, or automatic Desired Predictive Methodology (DPM), to make future predictions as to how said LEOSAT's radio antenna pattern will impinge spatially and temporally at TPD(s) locations in the current range or, alternatively, downrange along or near said LEOSAT's orbital pass (termed "Satellite Radio Pattern Spatial-Temporal Predictions" (SRPSTPs)), describing these predictions to Module 3 for its coordination via Module 4 with said TPD(s). Said Module 3 is further comprised of functionality allowing it to utilize said SRPSTPs provided by said Module 5, the ephemeris data provided by said Module 1, and the TPD registry location data provided by said Module 2, in order to appropriately allocate RCPs and IMPs as predicted to be needed to TPD(s) and to issue the appropriate control messages to TPD(s) to facilitate coordinated and orchestrated communications between said TPD(s) and said LEOSAT.

Additional CC Module 5 Functions and Desired Predictive Method: The CC of the preferred embodiment further comprises functionality such that said CC's Module 5 is further comprised of programming and functionality in order to generate said SRPSTPs. Module 5 is further comprised of functionality such that its Desired Predictive Methodology (DPM) comprises the following: CC is comprised of parallel computation and inter-coordination functionality and capabilities such that a number of automatically-generated parallel simulations pursuant to its predictions are performed within the functional control of Module 5, providing predictions in a more expedient, time-efficient and quickly convergent manner. Within Module 5 of the CC, numerous parallel computer simulations are performed, where each parallel computation instance assumes a different plane of LEOSAT spin or tumble under its given static antenna pattern. Module 5 is further comprised of functionality such that it considers TPD(s) locations and measurement data provided to it by so-coordinated TPD(s) under IMP instruction or control. Each said parallel simulation instance considers how said simulated LEOSAT, spinning or tumbling in its simulated plane, will cause its communications or radio signal footprint to impinge upon the Earth and to align at actual locations of said TPD(s), calculating what the likely simulated time-stamped signal levels received at TPD(s) from said simulated LEOSAT would measure. Then, for each of the said parallel simulation instances, these simulated measurements are compared to the actual measurements reported by TPD(s) under IMP instruction. Module 5's DPM is further comprised of functionality such that it allows said simulation instances each to be compared, one by one, or in parallel, or simultaneously, to the actual measured data collected from TPD(s), such that the simulation instance showing the closest correlation between its simulated time-stamped predicted measurements and the actual time-stamped measurements (as reported from TPD(s) up range or at other appropriate locations), is the simulation taken as being the best predictor for the actual spin or tumble plane of the actual said LEOSAT. At this point the prediction data from the best simulation instance (i.e. selected as best predictor) can be reported to said Module 3 allowing it to achieve its TPD coordination and orchestration since it now knows where and when said LEOSAT's radio antenna pattern will align on the Earth's surface and what TPD(s) will be in best alignment with said radio antenna pattern during which time slots. Module 5 is further comprised of functionality that may be used to determine or predict the store-and-forward delay of said LEOSAT, allowing it to better predict or instruct Module 3 as to the appropriate RMPs and IMPs to be issued to transmitting and receiving TPD(s) accordingly.

Function of CC Module 6: The CC of the preferred embodiment further comprises functionality such that said CC's Module 6 is comprised of programming and functionality in support of said Module 3 which allows messages or long messages intended for communications to said LEOSAT, or in the case of forwarding via said LEOSAT to destination TPD(s), to be a priori fragmented at said TPD, or at said CC prior to apportionment at CC by Module 6 to appropriate TPD(s) for transmission by said TPD(s) to said LEOSAT. Fragmentation and apportionment has a number of nonexclusive purposes.

First, in the case of a spinning/tumbling LEOSAT, said LEOSAT's antenna pattern may impinge upon a particular TPD only briefly, making it difficult to transmit long messages in whole or from said LEOSAT to a given TPD. The second purpose is to provide a degree of fault tolerance. Not all receiving TPDs can be guaranteed to always be connected via the Internet to said CC, but still optionally may each receive message fragments sufficient for assembly of a complete message via the LEOSAT forwarding to them a combination of their so received message fragments. This is especially important in the case where some TPD(s) may be in remote locations, with intermittent or even non-existent Internet connectivity to the CC or intermittent radio connectivity to said LEOSAT. For example, TPDs intermittently connected via the Internet to said CC optionally may have RCPs or IMPs assigned to them while connected to the CC, or via LEOSAT forwarding broadcasts, that can be used later when they are not connected to said CC, but to allow for their coordination when said LEOSAT flies over. Further, TPDs in remote locations without Internet access to said CC optionally may have been configured with RCPs or IMPs prior to field deployment, to an a priori known location, such that when deployed said TPDs now know how to apply RCP and IMP instructions during the appointed next LEOSAT flyover at an appointed or planned TPD location. Further, TPDs at locations with intermittent or no Internet access that receive message fragments from LEOSAT can potentially exchange fragments directly, or via radio, with TPD forwarding assistance, or they may accumulate a sufficient number of message fragments through exchange to combine them to construct the entire message from fragments collected over a number of LEOSAT flyovers or from separate TPDs where redundant message fragments optionally may have been stored, having been forwarded to them by said LEOSAT.

Whether the long message originates from a given TPD, or said CC itself, on its way to said LEOSAT, it optionally may be fragmented at the source, or routed centrally to said CC for fragmentation and then apportionment via Module 6 first. Said Module 6 is further comprised of functionality such that its said fragmentation and apportionment works as follows: (1) Module 3 with assistance from Module 6, fragments said message, intended for transmission to LEOSAT, into data packets of equal or unequal size, depending upon predicted receive signal quality and predicted signal duration from said LEOSAT, during specific time slots, at given TPD(s), scheduled by said CC to communicate with said LEOSAT. In essence, those TPD(s) predicted to have better view of or signal quality with said LEOSAT radio antenna pattern alignment (said footprint), during the time slot under consideration, optionally may have longer or larger packets apportioned to them for transmission, reserving the communication of more information to said LEOSAT, from those TPD(s) having or predicted to have superior signal quality, with respect to receive signal level from said LEOSAT, and hence better transmit prospects (i.e. TPD to LEOSAT for those longer packets); (2) Additionally, Module 3 with assistance of Module 6, optionally may apportion the packets comprising said message by allocating more packets to those TPD(s) units predicted to have better view of or signal quality with said LEOSAT radio antenna pattern alignment (footprint) during the time slot under consideration, again reserving the communication of more information to said LEOSAT, from TPD(s) having superior signal quality, with respect to receive signal level from said LEOSAT and hence better transmit prospects. Hence, functionality provided herein makes it possible to transmit longer messages to said LEOSAT for use by said LEOSAT or for forwarding by said LEOSAT to other TPD(s) by having the message transmission divided packet-wise among a plurality of transmitting TPDs, all predicted in turn to have the best chance of communicating with said LEOSAT during their respective time slots; (3) Fragments or packets are sequentially numbered for all fragments or packets making up the message that is transmitted from designated TPDs and forwarded via LEOSAT to other TPDs, so that upon receipt-collection by TPD(s) or by said CC, the received and collected fragments or packets may be assembled to comprise the original message; (4) Upon receipt of message fragments by one or more TPDs, or by a plurality of TPDs, said TPD(s) optionally may forward said fragments to said CC for reassembly; (5) Upon receipt of sequentially numbered message fragments and with the help of Module 6, Module 3 waits for all potentially missing fragments or packets to come in, and then reassembles the message upon receipt of final missing fragment or packet, and then routes the completed message to the destination TPD(s) or to said CC itself or to a user or manager with presence or an account on the system, at said CC or at a given TPD(s); (6) Said TPD(s) optionally may be further comprised of functionality, such that, upon receipt of message fragments by one or more TPDS, especially in cases where one or more TPDs are only in intermittent contact with said CC via the Internet or one or more TPDs are in remote locations without Internet access, said TPD(s) optionally may forward said fragments directly to other TPD(s) for fragment exchange for eventual reassembly of an entire message.

Function of CC Module 7: The CC of the preferred embodiment further comprises functionality such that said CC's Module 7 is comprised of programming and functionality that provides for IMP functionality and method within said CC, for each time slot and each TPD, as enumerated, but not limited to those IMPS, with routing and Internet-TPD interfacing assistance from Modules 3 and 4 respectively.

Function of CC Module 8: The CC of the preferred embodiment further comprises functionality such that said CC's Module 8 is comprised of programming and functionality such that said Module 8 is reserved for additional aspects of the present invention that include TPD(s) mobility and self-Mobility and control thereof.

Additional Embodiment of the Disclosed ESG-Grid

In an additional embodiment, the EGS Grid is comprised of further functionality, such that said CC Module 6, Module 3, and Module 4 and the TPD(s) are functionally augmented to support Computationally Augmented Random Linear Network Coding (CA-RLNC) to support wireless communications between TPD(s) directly and indirectly through TPD-to-TPD forwarding and TPD-to-TPD forwarding via LEOSAT, wherein said CC, TPD(s) and LEOSAT are generically referred to in this section as nodes. Computationally Augmented RLNC (CA-RLNC) optionally may be implemented through the following method: (1) Assignment by Module 3 of RCPs to TPD(s) based upon their cached RLNC-coded packet Working Set (WS) size (number of received linearly independent RLNC coded packets in cache) (i.e. those TPDs whose relative WS size (cache of RLNC coded packets from a message or batch) is greatest among the plurality of TPDs under said LEOSAT's orbital pass) and with the best radio view of said LEOSAT will be the ones most likely to be signaled by the CC to transmit, while other TPDs with smaller WS sizes or poorer view of said LEOSAT will be signaled as less likely to transmit, thus preserving channel bandwidth for TPD(s) with greatest WS size and best view of said LEOSAT; (2) Those TPD(s) designated by RCP instruction to receive, rather than transmit, and having the largest WS that is still less than m (where m is the total number of RLNC packets making up a message or batch) would be given probabilistic preference to receive (or receive and forward) from said LEOSAT or TPD forwarding or directly from other TPDs if the optional goal is to maximize the probability of receiving a complete message soon among a plurality of TPDs and with the fewest required transmissions. Hence, herein both said CC (Modules 2, 6, 3, and 4) and TPD(s) are comprised of augmenting functionality to coordinate IMP instructions to TPD(s) such that they respond by reporting their WS sizes for given message identifiers presented. Said Module 2 is further comprised of functionality to register and store WS size information pertaining to reporting TPDs, and to maintain current information in this regard. Said Module 6 is further comprised of functionality to apportion the greatest number of RLNC coded packets to TPD(s) with the best view of said LEOSAT and thus the best probability of successful transmission to said LEOSAT, or to those TPDs with the best view of other intermittently or remotely connected TPDs, and thus the best probability of transmitting to said other intermittently or remotely connected TPDs, which optionally may then forward packets to said LEOSAT. Said Module 3 is further comprised of functionality to generate and coordinate IMP delivery to TPD(s) to assess WS size at TPD(s) so instructed, and to make decisions in accordance with Module 6 with respect to packet apportionment and RCP instructions (i.e. for receive and transmit) to TPD(s).

While, the method identified above is one method for taking into account information about TPD WS size, when issuing IMPs and RCPs, the method is highly configurable by software configuration; any other obvious viable methods known to those having ordinary skill in the art are expected to be applicable. This method makes system communications more robust and fault-tolerant. Furthermore, said system and method is further comprised such that RCPs and IMPs may be issued to TPD(s) for the optional purpose of synchronizing TPD(s) to TPD(s) communications with or without the presence of LEOSAT(s).

RLNC coded communications linearly and algebraically combine only innovative (or linearly independent) packets received at participating network nodes, before forwarding, achieving efficiency gains, multicast capacity, and resilience in networks with changing topologies. RLNC networks optionally may be wired networks of nodes, wireless networks of nodes, or especially wireless broadcast or multicast networks, or a combination of all of these. RLNC networks contain source, forwarding, and destination nodes. At both source and forwarding nodes, the RLNC linear combination process divides messages, or data batches, into m equally sized packets (where m is the total number of such equally sized packets making up the full message or batch), linearly combining the packets using random coefficient multipliers, before transmitting both coded packet and its relatively small coefficient vector. RLNC achieves efficient bandwidth utilization by generating and forwarding a new coded packet at a node (from that node's accumulated WS), only when said node has received an innovative packet to be added to its WS (linearly independent with respect to the receiving node's WS). In essence, every one of a given node's forwarded packets contains new information from the perspective of the forwarding node. In order to be able to reconstruct a full message or batch from received RLNC coded packets, a receiving node (i.e. forwarding node or destination node) needs to receive any m linearly independent coded packets from the same message or batch. Due to the potential for packet erasure in any medium, especially in the case of wireless transmission or wireless broadcast, there may exist gaps or missing packets, causing a receiving node to have received and cached less than m independent packets. Hence, some nodes in the RLNC network will likely have cached more packets (larger WSs), closer to m total packets, and some fewer packets (smaller WSs). The following premises form the basis for said Computationally Augmented Random Linear Network Coding as described herein and as utilized in the present invention, representing a portion of the present invention: (1) The total of all independent packets belonging to the same message or batch, cached at a node, is termed that node's working set (WS); (2) RLNC coded packets, formed at a source node from source node caches having a WS of all m packets (the largest possible WS), are richer in information content than any RLNC coded packets formed from fewer than m packets at forwarding or destination nodes; (3) An RLNC coded packet transmitted from a node whose WS is greater than the node receiving said transmitted packet, will always be deemed independent and thus accepted at the receiving node, be it a forwarding node or a destination node; (4) Those receiving nodes with the smallest WS will have the greatest probability of ruling a random received RLNC packet (from the same message or batch) independent; (5) Those receiving nodes with the largest WS, but having a WS still less than m will have the greatest probability of reconstructing the message when receiving some number of RLNC coded packets belonging to the same message; (6) It is advantageous to pick those TPD nodes, or LEOSAT nodes, to transmit to said LEOSAT or to other TPD(s) for forwarding who have the largest WS, and to pick those nodes to receive having the smallest WS to maximize the number of independent packets cached or forwarded given a plurality of receiving nodes; and (8) It is advantageous to pick those nodes to transmit who have the largest WS and to pick those nodes to receive who already have the largest WS that is still less than m to maximize the probability of the message being reconstructed under the fewest transmissions, given a plurality of receiving nodes. Within said System and Method as described, nodes may be any TPD or LEOSAT comprising the ESG-Grid System and Method. These TPD(s) and LEOSAT(s) are hence further comprised of functionality allowing them and the ESG-Grid System and Method to exploit or take advantage of CA-RLNC as described herein.

Additional Embodiment of the Disclosed ESG-Grid—Providing TPD Mobility, Self-Mobility, and Self-Actuating Functionality An additional embodiment of the disclosed invention is comprised of further functionality such that said TPD(s) may be augmented to be stationary, portable, mobile or self-mobile or capable of self-actuation, or any combination of any of these, and may have directional antenna(s) with directional control, and may be equipped with or capable of using a variety of sensors or automated sensors. These sensor may including but not limited to accelerometers, compass, gyroscope, Global Positioning System, camera, microphone, tactile, temperature, barometric pressure, and others. The TPD(s) may also be equipped with or capable of using a variety of tools, including, but not limited to grabbers, probes, locomotion mechanisms, collective mechanisms, and others. Said TPD(s) may be further comprised such that they report their positional location via GPS or other means during a planned or unplanned TPD route or in advance of a planned or predicted TPD route. A portion or all of said TPD(s) are equipped with programming, hardware, and firmware allowing said TPD(s) to be remotely controllable from said CC, such that they accept and respond to said RCPs and IMPs, or to do and share in computation in its own right, or to do parallel computations among TPDs, so as to support running CC functions on clusters of TPDs.

Additional Embodiment of the Disclosed ESG-Grid—TPD Actuation Programming

In an additional embodiment, the disclosed invention is comprised of programming or functionality capable of implementing actuation commands without and with some degree of autonomy, such as, but not limited to locomotion, flight, deploying and using said tools, acquiring of software or hardware tools for use, or configuration of said tools, or use of same, use of said sensors, and acquiring, or configuration or use of said sensors. A portion or all of said TPD(s) are equipped with programming, hardware, and firmware allowing said TPD(s) tools and sensors to be remotely configurable and controllable from said CC. Methods for implementing such programming is known in the art.

Additional Embodiment of Disclosed ESG-Grid—TPD Control Onboard Configurable Control Actuations In an additional embodiment, said TPD is further comprised of a subcomponent, an augmented radio, capable of optionally being configured or programmed to accept and coordinate all TPD Onboard Configurable Control Actuations (TOCCAs) on said TPD(s) for TPD(s) wherein said TPD(s) are optionally configurable. Within said ESG-Grid, its said ITCCIP is further comprised and augmented to support issued or present TPD TOCCAs in addition to RCPs and IMPs, to be followed on an assigned time-slot basis by each TPD so instructed by said CC (where TPD(s) are optionally so configured) under control or command of real-time or nearly real-time configuration through CC-TPD coordination and configuration of each of the said TPD(s), TPD radios, or TPD(s) radio's onboard controlling computer(s).

Additional Embodiments of Disclosed ESG-Grid—TPD Embedding

In an additional embodiment, the TPD(s) are installed in other devices. These devices may include motor vehicles, robots, robotic vehicles, ballistics, balloons, kites, drones, missiles, cruise missiles, submersible probes, wearable body devices and body armor, tanks, robotic versions of said devices herein, and other devices each with an optional, highly configurable degree of response capabilities to ESG-Grid system and method TOCCA, RCP, and IMP commands and response from and to said CC respectively. In an additional embodiment, said TPD(s) may consist of sensor or actuation devices worn on or installed within the human body or the body of animal or plant species (e.g. birds, fish, reptiles, mammals, plants and others). Said embedded TPD(s) optionally may be highly configurable with respect to TOCCA, RCP, and IMP commands and response from and to said CC respectively.

In an additional embodiment, said TPD(s) can be installed within satellite base stations, computers, small computers, cell phones, smartphones, walkie-talkies, radios, software defined radios, consumer electronic devices, and other devices commonly associated with, but not limited to the Internet of Things (IoT). Said embedded TPD(s) optionally may be highly configurable with respect to TOCCA, RCP, and IMP commands and response from and to said CC respectively. For example, the TPD can be installed in a smartphone with Internet access to said CC, where said smartphone using an ESG-Grid software applications, can under CC control, in turn control an expensive radio board, configuring its RCP, IMP, and any available TOCCA functions during respective time slots. Said smartphone-based TPDs are orchestrated via said CC to affect Collaborative Integrated Services, wherein communications, instrumentation, and control-actuation functions are all controlled to deliver or provide CIS in support of higher-level functions, such as collaborative experiments, operations, or missions. For portable PGS units, a user may receive "beeps" under orchestration by said CC directing the user as to which way to point the hand-held antenna for best satellite reception. The CC can orchestrate this, since it is able to capture both the satellite ephemeris and the location of the user's PGS unit. So as to orchestrate experiments, operations, or missions, the TPD or for example a smartphone-controlled PGS operating as a TPD, can run an ESG-Grid application allowing a user to, through menu driven selections or an experiment, operations, or mission construction language, develop a software-implemented orchestration plan (SIOP) and to schedule its execution in the ESG-Grid.

In an additional embodiment, said TPD(s) can be installed within Micro Electronic Machines (MEMs) devices or interfaces to said MEMs devices. Said embedded TPD(s) may be highly configurable with respect to TOCCA, RCP, and IMP commands and response from and to said CC respectively.

Additional Embodiment of Disclosed ESG-Grid—TPD Clusters

In an additional embodiment, said TPD(s) are further comprise programming or functionality allowing said TPD(s), whether a homogeneous or heterogeneous mix of TPD(s), to collectively form TPD clusters, ad hoc TPD clusters, pre-programmed TPD clusters, or real-time commanded and dynamic, and self-adjusting TPD clusters, either autonomously or under CC control, by wired or wireless means or both, for the purpose of collaborating on but not limited to collective communications, computation, collective sensing tasks, collective locomotion and actuation tasks or higher order CC-coordinated or automated collaborative missions, such as Collaborative Integrated Services (CIS). For example, a cluster of TPD(s) may enhance communications with said LEOSAT since some TPD(s) may have connectivity with CC via the Internet, while others may have a good radio view of said LEOSAT but lack direct connectivity with said CC via the Internet. In such a case, TPD-to-TPD forwarding can be implemented to increase probability of CC to LEOSAT and hence TPD to LEOSAT and TPD to CC to TPD to LEOSAT communications, whether transmitting, forwarding, or receiving, with some degree of fault tolerance. Said TPD(s) are further comprised of functionality whether acting collectively or not, such that they optionally may be orchestrated or coordinated by said CC, through RCP, or IMP, or TOCCA commands from said CC. Said TPD(s) and clustering TPD(s) optionally may be highly configurable with respect to TOCCA, RCP, and IMP commands and response from and to said CC respectively.

Additional Embodiment of Disclosed
ESG-Grid—TPD Experiment Terminal and
Participation in Singular TPD or Collective TPD
Experiments In an additional embodiment, said TPD(s) are further comprise programming or functionality allowing said TPD(s) to act as a user access terminal or computer and optionally further be equipped with programming allowing the setup of simple or complex choreographed experiments by the user or by automated action, consisting of but not limited to automated experiments, automated coordinated and choreographed experiments, TPD-collective experiments, automated TPD-collective experiments, or TPD-collective experiments wherein TPD(s) have some degree of autonomy, wherein experiments optionally may involve TPD-implemented instrumentation or sensors, or sensor augmentations, or composite-collective instrumentation or sensors (i.e. implementation and sensing formed from a combination of sensors under coordinated action, or instrumentation and software collective action), TPD-implemented actuation or locomotion, composite-collective actuation or locomotion or physical 2D or 3D orientation, self-configuration or Collaborative Integrated Services (CIS), with combinations of communications, instrumentation, or actuation functions commanded and orchestrated by said CC through RCP, IMP, and TOCCA commands, as appropriate to the support of the experiment or mission at hand. CIS functions are optionally highly configurable with respect to TOCCA, RCP, and IMP commands and response from and to said CC respectively.

Additional Embodiment of Disclosed
ESG-Grid—TPD Reflexivity

In an additional embodiment said TPD(s) are further comprised of programming or functionality facilitating user or automated specification of an instrumentation or actuation collective service quality, further of measuring said TPD collective's own performance with respect to said specified service quality, and of self-adjusting automatically or physically to achieve said service quality or to improve its performance or resolution with respect to said service quality (called reflexivity). For example, for self-mobile devices, TPD position or location or antenna direction (singularly or collectively with respect to TPD(s)) may be adjusted to enhance communications quality of service with said LEOSAT. In general, the performance of Collaborative Integrated Services (CIS) may be self-adjusting through CC-TPD collaborative feedback and command adjustment to RCP, IMP, and TOCCA command parameters, so as to match or attempt to match user-specified service qualities or resolution.

Additional Embodiment of Disclosed
ESG-Grid—TPD Support for CA-RLNC

In an additional embodiment, said TPD(s) are further comprised of programming and functionality augmented to support Computationally Augmented Random Linear Network Coding (CA-RLNC) with or without all TPD(s) having Internet connectivity to said CC, in support of wireless communications between TPD(s) directly and indirectly through TPD-to-TPD forwarding and TPD-to-TPD forwarding via LEOSAT.

Additional Embodiment of Disclosed
ESG-Grid—TPD Support for Mobile Wireless
Computation Grids In an additional embodiment, said TPD(s) are further comprised of programming and functionality such that they are functionally augmented to support the automatic formation of ad hoc mobile wireless computational Grid(s), for parallel wired or wirelessly interconnected computing among and using the TPD resources themselves to support the ad hoc Grid(s) so formed, all of the functions of said ESG-Grid CC in the permanent or intermittent or temporary absence of said CC, including all functionality in said ad hoc Grid(s) as described by reference herein.

Additional Embodiments of Disclosed
ESG-Grid—Programming and Functionality in the
TPD(s) to Support the Accommodation of Mobile
TPD(s) with Route Planning or TPD(s) Orientation In an additional embodiment, said TPD(s) are further comprised of programming and functionality such that they are functionally augmented to serve as control terminal(s); that is, allowing a terminal user(s) or automated program at the TPD(s) to plan a route for the mobile or self-mobile TPD(s), coordinating the route or planned route with Module 2, so that mobile or self-mobile TPD(s) can be accommodated, and impingement of LEOSAT(s) radio antenna pattern can be predicted for these mobile or self-mobile TPD(s), allowing Module 3 to issue the appropriate RCPs, IMPs, TOCCAs, or CIS commands to effect coordinated communications or coordinated instrumentation or coordinated control actuation or coordinated said CIS commands or message transmission to and reception from mobile or self-mobile TPD(s) for the purpose of coordinated experimentation or missions (involving TPD(s) or LEOSAT(s), or coordinated TPD(s)-LEOSAT(s) communications. TPD(s) as described herein are further comprised such that they may coordinate planned locations or routes singularly or collectively (while they are connected via Internet to said ESG-Grid) a priori to the actual flyover of said LEOSAT(s), for use during actual said LEOSAT flyover, when one or more or all TPD(s) may be disconnected from said CC because said TPD(s) may be remote from Internet access or Internet access may be down, intermittently or permanently.

In an additional embodiment, said TPD(s) serving as control terminal(s) allow a terminal user(s) or automated program at the TPD(s) communicate current TPD(s) location(s) or orientations, coordinating the current location and current route or planned route with Module 2, so that mobile or self-mobile TPD(s) can be accommodated and impingement of LEOSAT(s) radio antenna pattern can be predicted for these mobile or self-mobile, or those TPD(s) that can be oriented or self-orienting TPD(s), based on actual or predicted orientation, allowing Module 3 to issue the appropriate RCPs, IMPs, TOCCAs, or CIS commands concurrent with TPD(s) movement or orientation to effect coordinated communications or coordinated instrumentation, coordinated control actuation, coordinated CIS commands or message transmission to and reception from mobile or self-mobile TPD(s) for the purpose of coordinated experimentation or missions or coordinated TPD(s)-LEOSAT(s) communications. TPD(s) as described herein are further comprised such that they optionally may coordinate planned locations or routes singularly or collectively (concurrently during movement, while they are connected via Internet to said ESG-Grid) for use during said LEOSAT concurrent or future flyover, when one or more coordinated TPD(s) become disconnected from said CC because said TPD(s) may be remote from Internet access or Internet access may be down, intermittently or permanently.

Additional Embodiments of Disclosed ESG-Grid—LEOSAT Control

In an additional embodiment, said LEOSATs are further comprised of programming and functionality such that they are functionally augmented with hardware and software configuration, enabling said LEOSAT to be under partial or full control of said ESG-Grid, wherein RCPs or IMPs or TOCCAs may be issued by CC to said LEOSAT, or originated from said TPD(s) and forwarded by one or more TPD(s) or by said CC via one or more TPD(s), under which said LEOSAT will then proceed to follow the issued RCP or IMP or TOCCA instructions to the best of its communications, instrumentation, actuation configuration, or CIS capabilities.

In an additional embodiment, said LEOSATs are further comprised of programming and functionality such that they are functionally augmented to be: controllably self-mobile or capable of self-actuation or propulsion in orbit or elsewhere in space; optionally equipped with or without attitude control, or any combination of any of these; optionally have directional antenna(s), optionally with or without directional control; may be equipped with switchable on/off directional antennas; optionally equipped with or capable of using a variety of sensors or automated sensors, including but not limited to accelerometers, compass, gyroscope, Global Positioning System, camera, microphone, temperature, instrument payload(s) for sensing of phenomena in orbit, including but not limited to measurement of radiation, electromagnetic fields, light intensity, solar wind particles, xrays, gamma rays, and others; and optionally be equipped with or capable of using a variety of tools, including, but not limited to grabbers, probes, locomotion mechanisms, deployment mechanisms, collective mechanisms, and others, and optionally may be configured allowing it to function as an orbital TPD. A portion or all of said LEOSAT(s) are optionally equipped with programming, hardware, and firmware allowing said LEOSAT(s) to be remotely controllable from said CC, such that they accept and respond to said RCPs and IMPs, do and share in computation in its own right, or do parallel computations among LEOSATs to support running CC functions on clusters of LEOSATs.

In an additional embodiment, said LEOSATs are further comprised of programming and functionality such that they are functionally augmented to accept and coordinate all RCPs, IMPs, TPD, or LEOSAT Onboard Configurable Control Actuations (Augmented TOCCAs) on said LEOSAT for LEOSAT(s) wherein said LEOSAT is so optionally configurable. Said ITCCIP is further comprised and augmented to support issued or present TPD or LEOSAT Onboard Configurable Control Actuations (Augmented TOCCAs) to be followed on a time-slot basis by said LEOSAT as instructed by the CC, as configured herein, under control or command of real-time or nearly real-time configuration through CC-TPD-LEOSAT coordination and configuration of said LEOSAT's radios, or its radio's onboard controlling computer.

Additional Embodiments of Disclosed ESG-Grid—LEOSAT Message Fragmentation

In an additional embodiment, said LEOSATs are further comprised of programming and functionality such that they are functionally augmented to support message fragmentation and apportionment such that said LEOSAT may originate and fragment or apportion message fragments or is functionally able to forward and apportion said message fragments under orchestrated RCP control of said CC (or said TPD clusters functioning as said CC) so that said LEOSAT may reserve transmission of longest message fragments during time slots when said LEOSAT's radio antenna pattern best aligns with best positioned TPD(s), which are also concurrently so instructed by said CC to listen for LEOSAT transmissions during same time slot. Said LEOSAT is further functionally augmented such that, under RCP control from said CC or said TPD cluster functioning as said CC, it may be signaled to listen during time slots when message fragments are likewise sent from TPD(s), where TPD(s) may reserve transmission of longest message fragments to listening LEOSAT during said time slots when best position or alignment of LEOSAT antenna pattern with transmitting TPD(s) occurs.

In an additional embodiment, said LEOSATs are further comprised of programming and functionality such that they are functionally augmented to support subdividing said message into equal length packets and to be capable of apportionment of packets such that said LEOSAT may originate and fragment said message into packets and apportion message packets or is functionally able to forward and apportion said message packets under orchestrated RCP control of said CC (or TPD clusters functioning as said CC) so that said LEOSAT may reserve transmission of the greatest number of message packets during time slots when said LEOSAT's radio antenna pattern best aligns with best positioned TPD(s) on the ground, which are also concurrently so instructed by said CC to listen for LEOSAT packet transmissions during similar best alignment time slot(s). Said LEOSAT is further functionally augmented such that under RCP control from said CC (or said TPD cluster functioning as said CC) it may be signaled to listen during time slots when message packets are likewise sent from TPD(s) on the ground, where TPD(s) optionally may be instructed to reserve transmission of greatest number of message packets during said time slots when best position or alignment of LEOSAT antenna pattern with transmitting TPD(s) occurs.

In an additional embodiment, said LEOSATs are further comprised of programming and functionality such that they are functionally augmented to act as an originating or forwarding node within the ESG-Grid system and method, and to respond to RCP or IMP or TOCCA orchestration control from said CC (or TPD cluster functioning as said CC). Said LEOSAT is further functionally augmented to support subdividing said message into equal length CA-RLNC or RLNC packets and apportionment of said packets such that said LEOSAT may originate and fragment a message into packets and apportion the message packets or can forward and apportion said message packets under orchestrated RCP control of the CC (or TPD clusters functioning as said CC) so that said LEOSAT may reserve transmission of the greatest number of message packets, or those CA-RLNC or RLNC packets with the greatest information content (i.e. generated from the greatest working sets WSs), during time slots when said LEOSAT's radio antenna pattern best aligns with best positioned TPD(s) or TPD(s) with the best WSs on the ground, wherein the TPD(s) are also concurrently so instructed by said CC to listen for LEOSAT packet transmissions during similar best alignment time slot(s). Said LEOSAT is further functionally augmented such that under RCP control from said CC, or said TPD cluster functioning as said CC, it may be signaled to listen during time slots when RLNC or CA-RLNC message packets are likewise sent from TPD(s) on the ground, where TPD(s) optionally may be instructed to reserve transmission of greatest number of message packets during said time slots when best position or alignment of LEOSAT antenna pattern with transmitting TPD(s) occurs.

Additional Embodiments of Disclosed ESG-Grid—LEOSAT Support for Coordinated Experiments In an additional embodiment, said LEOSATs are further comprised of programming and functionality such that they are functionally augmented to support single or collective coordinated or orchestrated experiments or missions (under control of said CC) onboard said LEOSAT alone or in conjunction with ground-based experiments likewise orchestrated by the CC performed by TPD(s) singularly or collectively under CC-coordinated RCP, IMP, and TOCCA command to provide CIS appropriate to the support of the coordinated experiments or missions at hand involving LEOSAT or one or more TPDs.

Additional Embodiments of Disclosed ESG-Grid—LEOSAT Antenna Time-Slot Based Positioning In an additional embodiment, said LEOSATs are further comprised of programming and functionality such that they are functionally augmented to support coordinated or orchestrated LEOSAT attitude control and directional antenna control (under control of said CC) onboard said LEOSAT, such that it may be positioned or its antenna positioned or pointed best to align with desired and best positioned TPD(s), during time slots coordinated by said CC, such that space and time division multiplexing of message fragments or packets may be achieved during said LEOSAT's transmission and reception of message fragments or packets. Positioning may be done based upon time slot, WSs present onboard said LEOSAT or onboard TPD(s), or based upon TPD location, current or planned mobility, or degree of plurality in a given direction. Said LEOSAT is optionally comprised of further functionality, such that directional antenna position may optionally be time division multiplexed. Said LEOSAT is optionally further comprised of functionality such that its positioning may be determined based upon best instrumentation functionality, best actuation or motion functionality, or to achieve best quality of service under communications, instrumentation, or actuation functionality under CC-coordinated RCP, IMP, and TOCCA command to provide CIS appropriate to the support of the coordinated antenna time slot positioning for best communications, instrumentation, or actuation operations, experiments or missions at hand involving LEOSAT or one or more TPDs.

Additional Embodiments of Disclosed ESG-Grid—LEOSAT Intercommunications with the Other LEOSATs In an additional embodiment, said LEOSATs are further comprised of programming and functionality such that they are functionally augmented so that said LEOSAT may intercommunicate with or participate in: (1) message relay or handoff with other LEOSAT(s) within radio range; (2) in a LEOSAT cluster; (3) in message fragmentation and apportionment or packet apportionment; (4) RLNC or CA-RLNC packet apportionment within said cluster under coordination of said CC; or (5) in said CA-RLNC. The LEOSAT may also be configured via programming to perform message or message fragmentation or packet relay between compatibly-configured LEOSAT's participating in said LEOSAT cluster, without or with attitude control being used for best time division multiplexed positioning or orientation of said LEOSAT antenna(s) for communications with other LEOSATs during specific time slots. Said LEOSAT is further comprised such that it may act under RCP, IMP and TOCCA commands to affect the appropriate supporting CIS when intercommunicating with other LEOSAT(s) or TPD(s) within radio range.

Additional Embodiments of Disclosed ESG-Grid—LEOSAT Cluster(s)

In an additional embodiment, said LEOSATs are further comprised of programming and functionality to be functionally augmented such that said LEOSAT when optionally operating within a cluster of LEOSATs and where all or a portion of said LEOSATs within cluster optionally may be under control of ESG-Grid via its said CC through TPD relay to said LEOSAT(s), said LEOSAT(s) may be so instructed by said CC, via RCP or IMP or TOCCA control messages to effect appropriate CIS support to conduct coordinated orchestrated intercommunications, collaborative instrumentation functions, or collaborative experiment(s) or mission(s), reporting all data/results to ESG-Grid for forwarding to the user. Said experiments or missions may involve both LEOSAT(s) in cluster and TPD(s) or TPD clusters.

Additional Embodiments of Disclosed ESG-Grid—Multiple ESG-Grid Merging and Splitting and ESG-Grid Support for all Augmented TPD and LEOSAT Functionality In an additional embodiment, said CC supports all functionality and options, and optional augmentations of TPD(s) or LEOSAT(s) functionality as described in one or more embodiments and single, or multiple, or distributed CCs which may or may not have intermittent connectivity to each other via the Internet or otherwise, for the purposes of distributing ESG-Grid CC functionality to multiple computational clouds to achieve a greater degree of fault tolerance, computational or parallel computational throughput, communications throughput or parallel communications throughput, to coordinate ESG-Grid activities associated with multiple sets of TPD(s) or multiple LEOSATs that may dispersed widely across the Earth's surface. Additionally, multiple ESG-Grids, may temporarily or permanently interconnect, so as to coordinate or collectively coordinate their activities or to share TPD(s) and LEOSAT(s) resources included within each ESG-Grid system. Said system and method is further comprised of functionality allowing a single ESG-Grid and its CC to split into two (2) or more ESG-Grids, for the purpose of temporarily or permanently coordinating with or being apportioned to geographically diverse sets of TPD(s) and LEOSAT(s) or to combine again at will for the purpose of coordinating activities when necessary. Said CC(s) as described herein optionally may be composed of TPD(s) or clusters of TPDs augmented with computation and communications capabilities and optional degrees of mobility and configuration such as to support degrees of CC, TPD, and LEOSAT functionality.

Additional Embodiment of Disclosed
ESG-Grid—Additional Module 8 Functionality

In an additional embodiment, said Module 8 further comprises algorithm(s) to effect mobility and motion control of said TPD(s) or said LEOSAT(s) as a support service for Module 3, or as a support service in support of communications, instrumentation, or actuation, which then issues appropriate TOCCA(s). Said algorithms can be coded by persons skilled in the art using known coding methods.

Additional Embodiments of Disclosed
ESG-Grid—CC Support for Message
Fragmentation In an additional embodiment, messages or batches intended for transmission may be divided into fragments of various sizes, where those fragments are apportioned to transmitting devices according to fragment size, and where larger fragment sizes are reserved for transmission by and for receiving by, those devices (i.e. TPD(s), LEOSAT(s)) with the best radio signal alignment (best radio signal strength and temporal window for the link) between transmitter and receiver, while smaller fragment sizes are allocated to those devices where the alignment may be of lesser quality, so as to seek to maximize communications throughput overall. The temporal window and average signal strength determines the allowable fragment size to be apportioned to that link during the temporal window. Herein, TPD(s) and LEOSAT(s) both may serve as transmitter or receiver with TPD(s) to TPD(s), TPD(s) to LEOSAT(s), LEOSAT(s) to TPD(s), and LEOSAT(s) to LEOSAT(s) orchestrated communications allowed. Fragments, apportioned by size at the CC, may be sent to TPD(s) by said CC for transmission to said LEOSAT(s) or other TPD(s), or fragments apportioned by size at said LEOSAT(s), with the size and to which TPD it is transmitted, also based upon alignment and temporal window of the link between said LEOSAT and at the given receiving TPD in question on the ground, or between said LEOSAT and another receiving LEOSAT in question in orbit. In essence, transmitter to receiver links with the highest quality and longest temporal window are allocated larger message or batch fragments for communications across the link.

Further, said CC may originate and fragment or apportion a message into a number of fragments and is functionally able to forward and apportion said message fragments to TPD(s) for transmission, and also to provide orchestrated RCP or IMP, or TOCCA control over said TPD(s), so that TPD(s) with the best aligned view of said LEOSAT(s), will be apportioned the longest fragments, so that the fragment size apportioned to each TPD is in accordance with that TPD(s)' radio view and temporal window (alignment), or predicted temporal window (predicted alignment) with said LEOSAT(s). Hence, said TPD(s) optionally may be instructed by the CC to reserve transmission of longer message fragments from the best aligned TPD(s) during time slots when said LEOSAT's radio antenna pattern best aligns with those best positioned transmitting TPD(s).

The CC may further be functionally augmented such that it may act as a collection and routing hub for batch or message fragments received by TPD(s) from said LEOSAT(s) and then relayed to it by said TPD(s). In this capacity, said CC serves as a collection point for a sufficient number of batch or message fragments to comprise a full batch or message, where numbers of fragments from the same batch or message are relayed to it separately from one or more TPDs. Once said batch or message is assembled from fragments at the CC and deemed complete, said CC is comprised of additional functionality to deliver complete batch or message to a designated (e.g. Cloud-based) user account, forward said batch or message to one or more user TPD that represent the message's final destination, or to divide once more the message into appropriately sized fragments and apportion these fragments by size to TPD(s) according to their alignment with said LEOSAT, for forwarding to said LEOSAT(s) when said LEOSAT(s) serve as a final destination for the message or batch, or according to their alignment with other TPD(s), for forwarding to still other TPD(s) or to said LEOSAT(s), when those TPD(s) or LEOSAT(s) serve as final destinations, respectively.

Once received fragments have been assembled by said CC into a completed message or batch, said CC is also functionally augmented herein to send acknowledgments of message complete ("MCA") through the appropriate TPD(s) having best alignment with of said LEOSAT(s) for transmission of those MCA to said LEOSAT(s), so as to efficiently utilize TPD-LEOSAT radio bandwidth, by responding with MCAs from the fewest number of best aligned TPD(s), with the fewest MCAs needed, and where those acknowledgements have the best chance of reaching said LEOSAT(s) needing those MCAs. This way seeks to minimize unnecessary retransmissions of MCAs.

Said system and method further comprises functionality within said CC multiple LEOSATs, or functionality such that said CC or said LEOSAT(s) may originate and divide or apportion message into a number of fragments or is functionally able to forward and apportion said message fragments by size to TPD(s) for forwarding, and provide orchestrated RCP or IMP, or TOCCA control over said LEOSAT(s), so that said LEOSAT(s) optionally may reserve transmission of the longer message fragments to the best aligned listening TPD(s) during time slots when said LEOSAT(s)' radio antenna pattern(s) best align with those best positioned TPD(s) or so that said LEOSAT(s) optionally may reserve transmission of the longer message fragments to other best aligned receiving LEOSAT(s) during time slots when said LEOSAT(s)' radio antenna pattern best aligns with those other best positioned or best oriented receiving LEOSAT(s) in radio range.

Said CC is further augmented such that it may also provide orchestrated RCP or IMP, or TOCCA control over said TPD(s), instructing them to listen while LEOSAT(s) or other TPD(s) are instructed to transmit, or to provide orchestrated RCP or IMP, or TOCCA control over said LEOSAT(s), instructing them to listen, while TPD(s) or other LEOSAT(s) are instructed to transmit.

Said CC is further functionally augmented such that it may act as a collection or routing hub for batch or message fragments, received by TPD(s) from said LEOSAT, or received by LEOSAT(s) from other LEOSAT(s) or from TPD(s) and then relayed to it. In this capacity, said CC serves as a collection point for a sufficient number of batch or message fragments to comprise a full batch or message, relayed to it separately from one or more TPDs or from one or more LEOSATs. Once said batch or message is complete, said CC is comprised of additional functionality to deliver complete batch or message to a designated user account or to forward said batch or message to a given TPD or group of TPDs as a final destination or to divide a message or batch and apportion certain fragments by size sufficient to comprise a batch or message to a TPD or TPDs, for forwarding to said LEOSAT(s).

Additional Embodiments of Disclosed ESG-Grid—CC Support for Message Fragmentation into Packets In an additional embodiment, the messages or batches intended for transmission may be divided into some number of Packets, where the number or portion of those Packets comprising said message or batch, are apportioned to transmitting devices such that the greatest percentage of packets by quantity, making up a message or batch, are reserved for transmission and receiving by those devices with the best radio signal alignment between transmitter and receiver, while the smaller portion of packets making up a message or batch are allocated to those devices where the alignment may be of lesser quality, so as to seek to maximize communications throughput overall. The temporal window and average signal strength due to alignment on the link between transmitter and receiver in part, determines the allowable portion of packets making up a message or batch to be apportioned to that link during the temporal window. Herein, TPD(s) and LEOSAT(s) both may serve as transmitter or receiver. Packets, apportioned at the CC, optionally may be sent to TPD(s) by said CC for transmission to said LEOSAT(s) or for transmission to other TPD(s), or packets apportioned at said LEOSAT(s), with the number of packets apportioned and to which TPD it is transmitted, also being based upon alignment and temporal window of the link between said LEOSAT and the given receiving TPD, or between said LEOSAT and another receiving LEOSAT in orbit. In essence, transmitter to receiver links with the highest quality and longest temporal window are allocated greater portions of the packets making up a message or batch for communication across the link.

Said system and method is comprised of further optional functionality, such that said CC may originate and divide or apportion a message into a number of packets or forward and apportion said message packets to TPD(s) for transmission, and provide orchestrated RCP or IMP, or TOCCA control over said TPD(s), so that TPD(s) with the best aligned view of said LEOSAT(s) will be apportioned the greatest portion of packets making up the message or batch, and packets apportioned to each TPD is in accordance with that TPD(s)' radio view and temporal window (alignment), or predicted temporal window (predicted alignment) with said LEOSAT(s) (i.e. the better the TPD's radio signal alignment with the LEOSAT and the longer its temporal window, the greater the number of packets that will be apportioned to it for transmission to the LEOSAT). Hence, said TPD(s) optionally may be instructed by the CC to reserve transmission of the greatest number of packets from the best aligned TPD(s) during time slots when said LEOSAT's radio antenna pattern best aligns with those best positioned transmitting TPD(s) on the ground.

Said CC is further functionally augmented such that it may act as a collection and routing hub for batch or message packets, received by TPD(s) from said LEOSAT(s) and then relayed to it by said TPD(s). In this capacity, the CC serves as a collection point for a sufficient number of batch or message packets to comprise a full batch or message, where certain numbers of packets from the same batch or message are relayed to it separately from one or more TPDs. Once said batch or message is assembled from received packets at the CC and deemed complete, said CC is comprised of additional functionality to: deliver complete batch or message to a designated Cloud-based user account; to forward said batch or message to a given user TPD or group of user TPDs that represent the message's final destination; divide once more the message into an appropriate number of packets, and to apportion numbers of these packets to a TPD or TPDs according to their alignment with said LEOSAT for forwarding to said LEOSAT(s) when said LEOSAT(s) serve as a final destination for the message or batch, or according to their alignment with other TPD(s), for forwarding to still other TPD(s) or to said LEOSAT(s), when those TPD(s) or LEOSAT(s) serve as final destinations. Once received packets have been assembled by said CC into a completed message or batch, said CC is also functionally augmented herein to send MCAs through the appropriate TPD(s) having best view of, or alignment with of said LEOSAT(s), for transmission of those MCAs to said LEOSAT(s), so as to efficiently utilize TPD-LEOSAT radio bandwidth, by responding with MCAs from the fewest number of best aligned TPD(s), with the fewest MCAs needed, and where those acknowledgements have the best chance of reaching said LEOSAT(s). This way seeks to minimize unnecessary retransmissions of MCAs.

Said system and method is comprised of further functionality, such that it supports through functionality further comprised, within said CC, multiple LEOSATs, or functionality such that said CC or said LEOSAT(s) may: originate and divide or apportion message into a number of packets; forward and apportion said message packets by quantity to TPD(s) for forwarding; provide orchestrated RCP or IMP, or TOCCA control over said LEOSAT(s) so that said LEOSAT(s) optionally may reserve transmission of the greatest quantity of packets by the best aligned listening TPD(s) during time slots when said LEOSAT(s)' radio antenna pattern(s) best align with those best positioned TPD(s) or so that said LEOSAT(s) optionally may reserve transmission of the greatest quantity of packets to other best aligned receiving LEOSAT(s) during time slots when said LEOSAT(s)' radio antenna pattern best aligns with those other best positioned or best oriented receiving LEOSAT(s) in radio range.

Said CC is further augmented to provide orchestrated RCP or IMP, or TOCCA control over said TPD(s), instructing them to listen while LEOSAT(s) or other TPD(s) are instructed to transmit or provide orchestrated RCP or IMP, or TOCCA control over said LEOSAT(s), instructing them to listen, while TPD(s) or other LEOSAT(s) are instructed to transmit.

Said CC is further functionally augmented such that it may act as a collection or routing hub for batch or message packets, received by TPD(s) from said LEOSAT or LEO-SAT(s) from other LEOSAT(s) or from TPD(s) and then relayed to it. In this capacity, said CC serves as a collection point for a sufficient number of batch or message packets to comprise a full batch or message, relayed to it separately from one or more TPDs or from one or more LEOSATs. Once said batch or message is complete, said CC is comprised of additional functionality to deliver complete batch or message to a designated user account or to forward said batch or message to a given TPD or group of TPDs as a final destination, or to divide a message or batch and apportion certain packets by quantity sufficient to comprise a batch or message to a TPD or TPDs, for forwarding to said LEO-SAT(s).

Additional Embodiments of Disclosed ESG-Grid—CC Support for RLNC or CA-RLNC

In an additional embodiment, said CC optionally may act as a collection and routing hub for CA-RLNC encoded packets received by TPD(s) from said LEOSAT. In this capacity, said CC serves as a collection point for a sufficient number of RLNC or CA-RLNC packets to comprise a full batch or message, relayed to it separately from one or more TPDs. Once said batch or message is complete, said CC is comprised of additional functionality to deliver complete batch or message to a designated user or to forward said batch or message to given TPD(s) for forwarding to said LEOSAT(s). Included here is RLNC based or CA-RLNC based acknowledgement control such that acknowledgements may be sent from said LEOSAT(s) or from any TPD(s) upon construction of an entire message or based upon some predicted number of packet transmissions required to produce a message at a receiving device. In the plurality of TPD(s), those TPDs orchestrated or chosen by said CC to transmit or receive from said LEOSAT are determined based on their view alignment and temporal window with said LEOSAT and their RLNC coded packet Working Set (WS) size.

Additional Embodiments of Disclosed ESG-Grid—CC Support for Orchestrated Communications, Instrumentation, or Control Actuation In an additional embodiment, said CC optionally may coordinate RCPs or IMPs, or TOCCAs, such that said ESG-Grid functions as a coordinated Communications (without and with TPD(s) in ad hoc cluster formation), Instrumentation (without and with TPD(s) in ad hoc cluster formation), or Actuation (without and with TPD(s) in ad hoc cluster formation) system to provide Collaborative Integrated Services, in control of TPD(s) or LEOSAT(s) and CC. Said CC, and said TPD(s) applications or terminal working in conjunction with said CC, optionally may be comprised of functionality such that collaborative, coordinated, and orchestrated communications or alternative collaborative, coordinated, and orchestrated communications methods, or collaborative, coordinated, and orchestrated instrumentation configurations or alternative collaborative, coordinated and orchestrated instrumentation configurations, or collaborative, coordinated, and orchestrated control actuations or alternative collaborative, coordinated, and orchestrated control actuations are implemented under said CC coordination (or a TPD collective acting as said CC) and orchestrated on said ESG-Grid. Under said functionality, said ESG-Grid will be capable of initiating, controlling, managing, and terminating experiments, over a scalable range of size and complexity, involving TPD(s) or LEOSAT(s), or CC(s) scalable through all augmentations described herein. ESG-Grid is further comprised of functionality within said CC, TPD(s), and LEOSAT(s) so as to provide Collaborative Integrated Services (i.e. mixes of RCP, IMP, and TOCCA control over Communications, Instrumentation, or Control Actuation) so as to support simple or complex experiment(s) or mission(s) at hand.

Additional Embodiments of Disclosed ESG-Grid—Support for Reinforced Learning In an additional embodiment, the ESG-Grid optionally supports reinforced learning and storage of knowledge gained through reinforced learning, pertaining to automatically measured or human manually reported degrees of success for experiments or missions carried out, so as to better adjust RCPs, or IMPs, or TOCCAs or CIS support to improve results in future experiments or missions. The ESG-Grid is provisioned with the ability for manual or automatic conduct of simple or orchestrated communications, instrumentation, or control actuation experiments, separately or in combination, and with the ability to find refined solutions manually or automatically through reinforced learning techniques, keeping solutions that perform better and discarding solutions that perform more poorly.

Additional Embodiments of Disclosed ESG-Grid—Support for Detection and Compensation Based Upon Adverse Conditions In an additional embodiment, the ESG-Grid optionally supports detection of aberrant weather or other conditions averse to ESG-Grid operation and allows for the pinpointing of said aberrant weather or other averse conditions with the assistance of reinforced learning techniques, such that said ESG-Grid cloud configuration or partitioning or TDP(s) or LEOSAT(s) RCP or IMP or TOCCA control can be automatically reconfigured to compensate with respect to communications or instrumentation, or control actuation expected qualities of service. For example, when TPD(s) are instructed to act as sensors, they may detect barometric pressure, temperature, wind speed, loss of alternating current power, or loss of Internet access in their respective geographic areas and to report back to the CC these conditions, stamped or labeled by location and time of occurrence. This way the CC knows of the location and time of certain reported aberrant conditions and then may utilize data fusion of sensed data from various sources so as to determine the macro event (big picture event) taking place to decide if said macro event is averse to ESG-Grid operation in an particular geographic area, allowing the ESG-Grid to make adjustments, promoting increased fault avoidance, increased fault tolerance, and increasing the robustness of the system and method. For example, as a compensating action, TPDs in some geographic area that are providing a certain instrumentation experiment function and are subjected to a storm or other averse situation could be replaced through CC-TPD orchestration in real time or nearly real time by other TPDs in other geographical areas upon their availability to take up the experiment that is being impacted in the first geographical area. Hence, the experiment could be moved, as-is, to a new location, automatically based upon the user's quality of service specifications/allowances.

Additional Embodiments of Disclosed ESG-Grid—Support for LEOSAT Positioning or Altitude Control In an additional embodiment, the ESG-Grid optionally supports experiments which adjust LEOSAT(s) altitude, where LEOSAT(s) are so equipped and augmented to respond to the CC's TOCCAs, in this respect, in conjunction with collaborative experiments on the ground among the TPD(s) so as to measure said LEOSAT(s) antenna pattern via TPD(s) signal level measurements and to best position said LEOSAT for communications, or instrumentation, or control actuation in conjunction with TPD(s) or to collect data relevant to said interactive positioning, with respect to communications, instrumentation, or control actuation or CIS support functions. Said interactive positioning optionally may be used in support of collaborative experiment or exploratory missions.

Additional Embodiments of Disclosed ESG-Grid—Support for Coordinated LEOSAT Information Exchange on Orbit In an additional embodiment, the ESG-Grid optionally supports uploads from said single or multiple CC(s) via their controllable TPD(s) and TPD(s) to LEOSAT(s) radio link, to separate and multiple or a plurality of LEOSATs, for the purposes of setting up a coordinated LEOSAT(s) to LEOSAT(s) communications exchange, either when said LEOSAT's orbits intersect directly or indirectly via TPD relay to one or more LEOSATs, and other TPD relay to other one or more LEOSATs, with RCP, IMP, and TOCCA instructions as to the time, position or orientation required at each LEOSAT for the communications exchange. The LEOSAT(s) communications exchange may be commanded to occur simultaneously, or they may occur as a series of coordinated exchanges or a communications relay consisting of a number of in orbit communications exchanges at various coordinated orbital locations around the globe. In this case, CC Module 1 keeps track of the ephemeris of each LEOSAT (so as to predict its location at some planned time) and further tracks the TPD(s) locations for all TPD(s) involved in the handoff. The orchestration of this handoff may be manually or automatically constructed. For example, a query can be manually entered into the ESG-Grid system, allowing it to determine through its ephemeris predictive mechanisms and through keeping track of several LEOSATs, if one or more will be in radio range of each other at given points in their orbits, and, if permission to utilize said LEOSATs is given, the CC can orchestrate RCP, IMP, and TOCCA commands via TPD(s) stationed around the globe, so as to upload communications and RCP, IMP, and TOCCA commands to each of the satellites to be involved in the exchange a priori to the actual communications exchange. Communications may be, for example, sensed data from some remote part of the globe that needs to get to another remote part the globe, while the RCP, IMP, and TOCCA commands from the CC(s) to each satellite may instruct each satellite as to what information will be communicated and when it will be communicated, what radio signal strengths to be measured and sensed from other LEOSAT(s) in order to establish the number of packets appropriate to communicate (temporal window—LEOSAT to LEOSAT), and what antenna/attitude orientation is required of each LEOSAT for the best chance of success in the orchestrated communications exchange.

Additional Embodiments of Disclosed ESG-Grid—Module 6 Further Defined Optimal Functionality In an additional embodiment, said Module 6 in coordination with Module 5 modulates or controls fragment resolution (fragment size) or packet size, based on predicted satellite spin rate and impingement time at TPD(s) or cluster of TPDs. From satellite's standpoint, one fragment size that is the overall best fit among a group of TPD locations may be best. When TPDs transmit, appropriate sized fragments are sent to TPDs based upon TPD parameters and TPD-Sat relative parameters, and TPD-TPD relative parameters in case of forwarding. Fragments can be further fragmented when relocating from one TPD transmitter to another, if need be based on signal strength window. Module 6 is highly configurable and can be configured to determine appropriate fragment sizes for orchestrated LEOSAT communications exchange.

Additional Embodiment of Disclosed ESG-Grid—Support for Clusters

In an additional embodiment, when clusters of TPD(s) or clusters of LEOSAT(s) or clusters formed from combinations of TPD(s) and LEOSAT(s) act or perform the functions of said CC, said devices (i.e. TPDs, and LEOSATs) are equipped with functionality such that they exchange stateful (relating to the device's, i.e. TPD or LEOSAT state of computation) information on their computational and communications state checkpoints with each other, so that one or more said devices can take over in the case of temporary or permanent failure or communications disconnect from the cluster by any device(s). In doing so, the state of communications, instrumentation, or control actuation is not lost and functionality can continue in the presence of some device faults.

Additional Embodiments of Disclosed ESG-Grid—Module 5 Provided Support

In an additional embodiment, Module 5 is comprised of additional functionality such that measurements reported from TPD(s) or LEOSAT(s) whether said TPD(s) or LEOSAT(s) are in motion or not, may be used to infer LEOSAT orbital spin rate and plane of spin, expected to be encountered at a future location where some communications, instrumentation, or control actuation, or CIS action is to be taken. Herein TPD(s) and LEOSAT(s) report location, velocity, orientation, and time stamp to Module 2 for user by Module 5 in predictive analysis.

In an additional embodiment, Module 5 is comprised of additional functionality such that measurements reported from TPD(s) or LEOSAT(s) whether in motion or not, may be used to infer or predict location, motion, velocity, acceleration, orientation, and angular orientation position, velocity, and acceleration for TPD(s) or LEOSAT(s) orbital spin rate and plane of spin, expected to be encountered at a future location. Herein TPD(s) and LEOSAT(s) report location, velocity, orientation, and time stamp to Module 2 for storage, and for later use by Module 5 in predictive analysis.

In an additional embodiment, Module 5 is comprised of additional functionality such that it supports use and predictive consideration of switchable antenna patters at LEOSAT(s) or TPD(s).

In an additional embodiment, Module 5 is comprised of additional functionality such that it supports sharing of information between respective Module 5s contained in distributed, or separate CCs.

Additional Embodiments of Disclosed ESG-Grid—Module 1 Augmentations

In an additional embodiment, Module 1 is comprised of additional functionality to accommodate data from multiple LEOSATs and all augmentations thereof. Included in said augmented functionality is optionally to enable the corresponding Module 1 units of separate CCs to share information between CCs for Module 5's utilization and other modules in each CC.

In an additional embodiment, Module 1 is comprised of additional functionality to accommodate said IMP orchestrated data collection from multiple orbital passes of the same or multiple LEOSATs Module 5's and other modules' use in the same or each CC.

Additional Embodiment of Disclosed ESG-Grid—Module 5 Augmentations

In an additional embodiment, Module 5 takes input from Module 1 pertaining to multiple LEOSAT(s) ephemeris data and from Module 2 which is augmented to report measurement data pertaining to LEOSAT measurements of signals from each other, and to utilize said multiple LEOSAT data to make predictions as to LEOSAT relative location, velocity, acceleration, and angular orientation in said cluster, to enhance LEOSAT to LEOSAT communications, coordinated and orchestrated instrumentation, actuation, or experimentation, or missions involving the LEOSAT cluster or TPD(s) or TPD clusters as part of the function of the overall ESG-Grid.

Additional Embodiment of Disclosed ESG-Grid—Module 3 Augmentations

In an additional embodiment, Module 3 sends TOCCAs to via TPD(s) radio transmission to LEOSAT(s), where LEOSATs are within range of each other and wherein said LEOSATs have formed a cluster. Said TOCCAs are sent in each time slot so as to control the attitude of each LEOSAT making up the cluster during particular time slots to temporally choose the LEOSATs that are each involved in the exchange of information. Within said system, said LEOSATs may each be equipped with directional antennas or switchable directional antennas. Given said further optional capability, simulations are done with a plurality of parallel instances in Module 5, such that a set of optimal communications exchange scenarios between LEOSATs on a time slot basis may be determined in order to effect efficient communications exchange between said LEOSATs. Module 3 is further optionally augmented to, via Module 4, issue TOCCAs via the Internet, which are then forwarded to the LEOSAT cluster by TPD(s), so that LEOSAT communications exchange can occur under one or more choices from the set of a priori determined optimal communications exchange scenarios. As a basis for determining optimal communications exchange scenarios, Module 5 may obtain LEOSAT location, velocity, acceleration, 3D orientation, directional antenna capability, switchable directional antenna capability, LEOSAT attitude and attitude variance, 3D rate of angular rotation, angular position, angular acceleration, battery capacity, and overall LEOSAT health or fault state or onboard propulsion capabilities, as well as access of one or more LEOSATs to neighboring LEOSAT resources or natural resources which may enhance communications during the time slots(s) in question. Under this embodiment, the same processes are held to apply to land, sea, or airborne TPDs, so organized in clusters for efficient communications exchange. Under this claim, the same processes are held to apply to land, sea, or airborne TPDs combined with LEOSAT(s) in the ESG-Grid. Said cluster(s) of TPDs or LEOSATs are further comprised of functionality such that those TPD(s) or LEOSAT(s) not directly reachable from TPD(s) having Internet connectivity back to said CC may be reached by forwarding of communications from other TPD(s) or LEOSAT(s) for the purpose of relaying RCP, IMP, and TOCCA instructions, relaying messages or fragments or packets, relaying RLNC coded packets, relaying CA-RLNC coded packets, or establishing appropriate CIS support for time-division multiplexed communications within said TPD-TPD, TPD-LEOSAT, and LEOSAT-LEOSAT clusters.

In an additional embodiment, Module 6 optionally may send RCPs, IMPs, and TOCCAs to LEOSAT(s) so as to cause transmitting or forwarding LEOSAT(s) to fragment or apportion message into fragments, packets, RLNC packets, or CA-RLNC packets or to make decisions about optimal communications scenarios based upon RLNC Working Set (WS) size at TPD or LEOSAT nodes within TPD-TPD, TPD-LEOSAT, or LEOSAT-LEOSAT clusters. In this embodiment, the same processes are held to apply to land, sea, or airborne TPDs organized in clusters for efficient communications exchange and to land, sea, or airborne TPDs combined with LEOSAT(s) in said ESG-Grid system and method.

Additional Embodiment of Disclosed ESG-Grid—General Augmentations to TPD or LEOSATS In an additional embodiment, where, in the absence of CC(s), TPD(s) or said LEOSAT(s) function as a mobile wireless computational grid, where computation is shared among mobile or self-mobile devices through information exchange among the wireless TPD(s) or LEOSAT(s). Under said system and method, the CCs functional modules are implemented through mobile agents running on multiple TPDs or LEOSATs, by any practical means for achieving same, so that the ESG-Grid may achieve a degree of functionality without Internet-based servers utilized to implement CC functions. Herein this embodiment, the computational resources of the TPD(s) or LEOSAT(s) themselves optionally may be used to implement the said CC functions. The intent here is to provide CC functionality in remote areas or in emergency situations where Internet access may not be available.

Additional Embodiment of Disclosed ESG-Grid—Module 2 Augmentation

In an additional embodiment, Module 2 is optionally augmented by programming to track TPD or LEOSAT positional resources (i.e. current, planned, mobility or orientation or predicted mobility or predicted orientation of TPD(s) or LEOSAT(s) in the field or in orbit respectively). Module 2 is further augmented herein to track relative positional resources, i.e. relative position, relative velocity, relative acceleration, or relative orientation among all respective participating field devices (i.e. TPD(s) and LEO-SAT(s)). Module 2 functions, through programming and functionality, facilitate either automatic polling of said field devices by said CC or by automatic reporting to said CC via the Internet or other means (e.g. wireless LEOSAT link or LEOSAT wireless forwarding). In essence, if a given TPD or LEOSAT does not have the positional or relative positional resource needed to accomplish some task, then its neighboring TPD or LEOSAT may have those resources.

In an additional embodiment, Module 2 is optionally augmented by programming to keep track of hardware or software sensory capability associated with TPD(s) or LEOSAT(s) in the field or orbit. Said augmented functionality of said Module 2 may include accelerometers, compass, gyroscope, Global Positioning System, camera, microphone, temperature, wind speed, moisture, humidity, salinity, magnetometer, instrument payload(s) for sensing of phenomena in in field or in orbit such as measurement of radiation, electromagnetic fields, light intensity, solar wind particles, x-rays, gamma rays. Said augmented functionality of said Module 2 also comprises instrumentation software or programming to assess, record, and analyze, relative sensing (i.e. sensing relative from one TPD or LEOSAT to another) such as relative acceleration, relative directional orientation, relative position, relative camera view, tomography of views, relative sound detection, relative temperature differences, relative wind speed differences, relative moisture differences, differences in humidity, relative salinity differences, relative magnetic field differences, and relative instrument payload(s) for sensing of phenomena including but not limited to measurement of radiation, electromagnetic fields, light intensity, solar wind particles, x-rays, gamma rays. Said augmented functionality of said Module 2 also includes tracking actuation and relative actuation capabilities of TPD(s) or LEOSAT(s) including but not limited to locomotion and locomotion method capabilities, flight capabilities, deployment capabilities, tools and tool capabilities, onboard software or hardware, hardware or software tool configuration, grabbers and grabber capability, probe and probe capability, collective action mechanisms, communications capabilities, size, weight, acceleration capabilities, velocity capabilities, position capabilities, software or hardware computational capabilities, temperature range tolerance, vibration tolerance, radiation tolerance, environmental range, battery capacities, solar panel capacities and others.

Additional Embodiment of Disclosed
ESC-Grid—Predictive Satellite Radio Pattern
Spatial Temporal Predictions In an additional embodiment, said Module 5 is optionally augmented to add parallel predictive simulations in order to determine Predictive Satellite Radio Pattern Spatial Temporal Predictions ("SRPSTP") for relay and coordination with Module 3, given that multiple parameter control over LEOSAT(s) or TPD(s) or clusters of same is possible. The process by which said multiple parameters are considered includes, but is not limited to massive parallel computational simulations in said CC, under control of Module 5, to determine sets of optimal or near optimal scenarios. Module 5's augmentation herein may include IMP and RCP actions, in conjunction with TOCCA actions, in coordination with said Module 7 and said Module 8, as miniature characterization experiments to provide feedback to Module 2 for coordination with Module 5, so that Module 5 may make adjustments to eliminate some unneeded simulations and to converge on the simulation that is optimal or near optimal and most closely matches or correlates with characterizing experimental trials. Module 5 also optionally includes reinforcement-learning methods to assist over time and repeated trials in fine-tuning its optimization performance and improving its convergence time.

In an additional embodiment, said Module 5 is optionally augmented to add parallel predictive simulations in order to determine said SRPSTP for relay and coordination with Module 3, given that multiple unequal time slot hypothetical consideration parameters are possible. The process by which said multiple hypothetical unequal time slot parameters are considered includes, but is not limited to, massive parallel computational simulations in said CC, under control of Module 5 to determine sets of optimal or near optimal scenarios. Module 5's augmentation herein may include IMP and RCP actions, in conjunction with TOCCA actions, in coordination with Module 7 and said Module 8, as miniature characterization experiments with various unequal time slot scenarios under communication, instrumentation, or control actuation, so as to provide feedback to Module 2 for coordination with Module 5 so that Module 5 may make adjustments to eliminate some unneeded simulations, and enabling it to converge on the simulation that is optimal or near optimal and most closely matches or correlates with characterizing experimental trials. Module 5 also optionally includes reinforcement-learning methods to assist over time and repeated trials in fine-tuning its optimization performance and improving its convergence time.

In an additional embodiment, said Module 5 is optionally augmented to add parallel predictive simulations in order to determine said SRPSTP, for relay and coordination with Module 3, given that multiple switchable antenna pattern capability is present at one or more LEOSATs or TPDs. The process by which said multiple hypothetical switchable antenna patterns are considered includes, but is not limited to, massive parallel computational simulations in said CC, under control of Module 5, to determine sets of optimal or near optimal scenarios. Module 5's augmentation herein may include IMP and RCP actions, in conjunction with TOCCA actions, in coordination with Module 7 and said Module 8, as miniature characterization experiments with various switched antenna pattern scenarios under communication, instrumentation, or control actuation, so as to provide feedback to Module 2 for coordination with Module 5, so that Module 5 may make adjustments to eliminate some unneeded simulations, and to converge on the simulation that is optimal or near optimal and most closely matches or correlates with characterizing experimental trials. Module 5 also optionally includes reinforcement-learning methods to assist over time and repeated trials in fine-tuning its optimization performance and improving its convergence time.

Additional Embodiment of Disclosed
ESG-Grid—Modules 7 and 8 Augmentation

In an additional embodiment, said Modules 7 and 8 are optionally augmented to facilitate composite TPD(s) or LEOSAT(s) experiments or missions, where TPD(s) or LEOSAT(s) collaborate in said experiments or missions. Within said augmentations, described herein, Module 7 may coordinate with Module 3 to issue IMPs, RCPs, and TOCCAs to configure instrumentation on specific TPD(s) or LEOSAT(s) as needed to perform collective experiments or missions. With said augmentation, Module 7 may coordinate with Module 8 to issue and orchestrate TOCCAs with Module 3 to coordinate orchestrated mobile action among TPD(s) or LEOSAT(s) in the field or orbit, respectively to assist in carrying out coordinated experiments or missions and to provide appropriate CIS support for said experiments and missions.

Additional Embodiment of Disclosed ESG-Grid—Module 6 Augmentation

In an additional embodiment, said Module 6 is optionally augmented by software, firmware, or hardware programming to consider how to apportion message fragments or numbers of packets, RLNC packets, or CA-RLNC packets to TPD(s) or LEOSAT(s) under scenarios of controllable TPD or LEOSAT orientation. Module 6 is optionally augmented via software, firmware, or hardware programming to initiate some hardware-software in the loop characterization experiments and some simulation experiments in conjunction with field devices (TPD(s) or LEOSAT(s)) and Module 5 to develop optimal or near-optimal message, fragment, or packet, or RLNC coded packet, or CA-RLNC coded packet apportionment schemes for actual communications. Module 6 is optionally augmented herein to support coordinated experiments or missions while taking controllable orientation among TPD(s) or LEOSAT(s) into account.

In an additional embodiment, said Module 6 is optionally augmented to be capable of unequal time slot and variable fragment resolutions considerations in its apportionment decisions to develop its apportionment scheme. In its apportionment scheme determination, the ESG-Grid coordinates with Module 5 to pose simulations and takes direction from Module 5 as to apportionment schemes to facilitate hardware-software in the loop characterization experiments. Module 6 is further optionally augmented to consider message fragmentation into packets, RLNC packets or CA-RLNC packets under equal and unequal time slot considerations where time slots are apportioned to said LEOSAT(s)' orbital flyover. Module 6 will be capable of working with Module 3 to issue variable and potentially differing fragments and fragment resolutions, differing numbers of packets, and RLNC and CA-RLNC packets with differing WS magnitudes among TPD(s) or LEOSAT(s).

Figure 5:
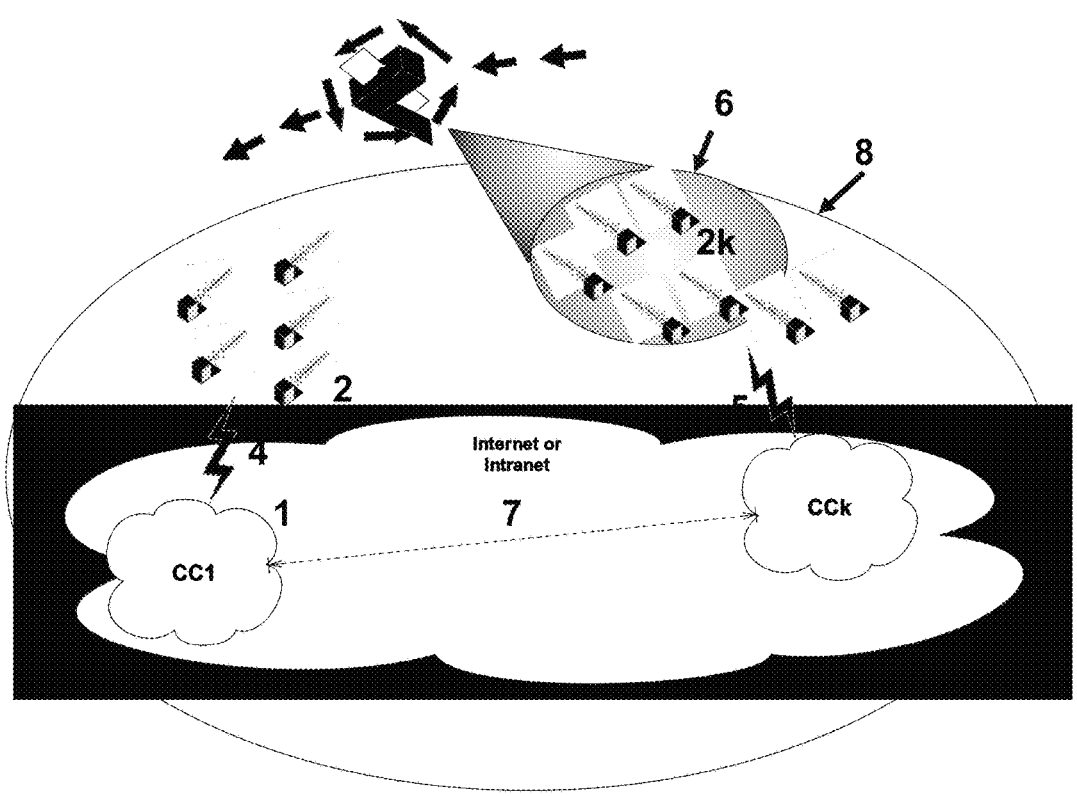
FIG. 5 depicts an additional embodiment of the EXPERIMENTAL SMARTPHONE GROUND STATION GRID SYSTEM AND METHOD wherein multiple computational clouds or a digital computational cloud is utilized.

In an additional embodiment, Module 6 is augmented to permit feedback controlled tuning of communications fragment size or numbers of packets to be communicated within clusters of TPDs or LEOSATs. As depicted in FIG. 5, within the cluster of nodes (i.e. TPD(s) or LEOSAT(s)), nodes exchange communications in a series of characterization experiments or training trials, so as to facilitate feedback-controlled tuning of fragment size or number of packets appropriate to be used between each pair of nodes, considering position, relative position, velocity, relative velocity, orientation, relative orientation, node-to-node radio signal strength, and node-to-node temporal window size.

Additional Embodiment of Disclosed ESG-Grid—CC Augmentation to Facilitate Job Scheduling In an additional embodiment, jobs can be scheduled on the CC to allow the ESG-Grid to orchestrate the jobs (collaborative experiments, collaborative missions, or collaborative missions) and then to deliver any results or status to the user who scheduled said job. In order to schedule said jobs, the ESG-Grid CC utilizes a job queue, accepts the user's specified quality of service, including performance and time limits, and then checks for available resources among competing scheduled jobs, potentially involving CIS. Said CC automatically manages said jobs allocating and de-allocating resources as necessary during the course of job execution. All of this may be done transparently to the user or through varying degrees of manual interaction. Moreover, jobs can be scheduled concurrently, provided the ESG-Grid determines that resources either may be shared or separately used by the concurrently running jobs.

Additional Embodiment of Disclosed ESG-Grid—Comprehensive Modification of Grid In an additional embodiment, the ESG-Grid may comprise any and all of the augmentations and embodiments as described herein such that all modification options may be included in a singular embodiment.

While the disclosed system and method was designed for use with low earth orbiting satellites, the features and advantages of this design described in the application can be utilized by a number of different industries.

The described features, advantages, and characteristics may be combined in any suitable manner in one or more embodiments. One skilled in the relevant art will recognize that the various components of this design may be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the embodiment is included in at least one embodiment. Thus the appearance of the phrase "in one embodiment", "in an embodiment", and similar language throughout this specification may, but do not necessarily, all refer to the same embodiment.

Reference throughout this specification to "programming" or "functionality" provided for the invention refers to software or hardware implementation of this functionality, methods for performing which are known in the art.

The invention claimed is:

1. A terrestrially distributed digital network system for orchestrated and coordinated control of ground to satellite, satellite to ground, and ground to ground communications comprising:
   (a) at least one Terrestrial Participant Devices (TPD);
   (b) at least one Low Earth Orbiting Satellite (LEOSAT); and
   (c) a Computational Cloud;
   wherein the orchestration and coordination of communications between the TPD and LEOSAT is controlled by the Computational Cloud;
   wherein the orchestration and coordination of communications between TPDs is controlled by the Computational Cloud; and
   wherein the Computational Cloud controls communications on a time-slot-by-time-slot basis to each said TPD for the duration of the LEOSAT's orbital pass.

2. The system of claim 1, wherein each of the at least one TPD comprises:
   (a) a radio; and
   (b) a ground station;
   wherein the radio is capable of being computationally commanded by the Computational Cloud;
   wherein said TPD is connected to the Internet;

wherein said TPD is capable of performing wireless communications and wireless signal measurements and providing and storing its Global Positioning Coordinates.

3. The system of claim 1, wherein each of the at least one LEOSAT comprises:
   (a) a satellite; and
   (b) a radio antenna;
wherein said LEOSAT is capable of computing, performing wireless communications, and receiving, storing, and forwarding communications received from said TPDs.

4. The system of claim 1, wherein the TPDs are geographically distributed on the Earth's surface.

5. The system of claim 1, wherein the LEOSAT may be equipped with stabilization, attitude control, radio parameters, or other satellite parameters under direct control of the terrestrially distributed digital network system.

6. The system of claim 1 further comprising programming providing temporal-spatial coordination and control of TPDs.

7. The system of claim 3, wherein said LEOSAT's radio antenna pattern spatial-temporal alignment with said TPDs is predicted in advance by the Computational Cloud, wherein said Computational Cloud further comprises programming to perform said prediction.

8. The system of claim 1, wherein the Computational Cloud is comprised of Internet-based computing facilities.

9. The system of claim 1, wherein the Computational Cloud comprises: (a) Module 1, comprising an Ephemeris Software Module; (b) Module 2, comprising a TPD Registry Module; (c) Module 3, comprising a TPD Communications Profile Planning Software Module; (d) Module 4, comprising an Internet Communications Software Module; (e) Module 5, comprising a Multi-Satellite Radio Path Predictor Module; (f) Module 6, comprising a Message/TPD Apportionment Module; (g) Module 7, comprising a Composite Pre-Tuned Instrument Module; and (h) Module 8, comprising a Mobile Control Module.

10. The system of claim 9, wherein Module 1 further comprises a database of each of the at least one LEOSAT's predicted orbital position with respect to time and geographic locations.

11. The system of claim 9, wherein Module 3 issues TPD Issued Temporal Control, Communications and Instrumentation Profile (ITCCIP) for each TPD on a time-slot-by-time-slot-basis;
   wherein said ITCCIP is further comprised of Radio Communications Parameters (RCPs) and basic Instrumentation Parameters (IMPs).

12. The system of claim 9,
   wherein at least one TPD is connected to the Computational Cloud via the Internet;
   wherein Module 1 provides its current and predicted LEOSAT location data to Module 3;
   wherein Module 2 provides registry data and TPD location data to Module 3;
   wherein Module 4 serves as the Internet interface function between Module 2 and said TPD having Internet connectivity with Module 4;
   wherein Module 5's Satellite Radio Pattern Spatial Temporal Predictions (SRPSTPs) are described to Module 3 for Module 3's coordination with said TPD; and
   wherein Module 3 utilizes the data provided by Modules 1, 5, and 2 to coordinate and orchestrate communications between the TPDs and LEOSAT.

13. The system of claim 9, wherein the Ephemeris Software Module is updated automatically from an automatic ground station locator source.

14. The system of claim 9, wherein Modules 6, 3, and 4 and the TPDs are functionally augmented to support Computationally Augmented Random Linear Network Coding.

15. The system of claim 1, wherein the TPD further comprises a sensor.

16. The system of claim 1, wherein the TPD is capable of implementing actuation commands.

17. The system of claim 1, wherein the TPD further comprises a subcomponent that is capable of accepting and coordinating TPD Onboard Configurable Control Actuations.

18. The system of claim 1, wherein the TPD further comprises functional augmentation to support the automatic formation of ad hoc mobile wireless computational grids.

19. The system of claim 18, wherein the Computational Cloud's functional modules are implemented through the mobile agents running on each of the at least one TPD or LEOSATs.

20. The system of claim 1, wherein the LEOSAT further comprises software and hardware configurations allowing said LEOSAT to be under partial or full control of the system.

21. The system of claim 1, wherein the LESOAT further comprises functionality to perform message fragmentation and apportionment, wherein said LEOSAT may originate and fragment or apportion said message and forward said message or fragments.

22. The system of claim 9, wherein Module 8 further comprises programming to effect mobility and motion control of the TPD or LEOSAT.

23. The system of claim 1, wherein the system provides support for reinforced learning and storage of knowledge gained through said reinforced learning.

24. The system of claim 19, wherein the system is capable of detecting adverse conditions and pinpointing those conditions using the reinforced learning techniques.

25. The system of claim 1, wherein each of the at least one TPDs is capable of transmitting data to other TPDs in the system.

26. The system of claim 1, wherein:
   multiple TPDs can form TPD clusters;
   multiple LEOSATs can form LEOSAT clusters;
   a combination of TPDs and LEOSATs can form combination clusters; and
   said combination clusters comprise the functionality to perform the functions of the Computational Cloud.

27. A method for improving communication between at least one Terrestrial Participation Device (TPD) and a Low Earth Orbiting Satellite (LEOSAT) comprising: (a) placing at least one TPD in or near the LEOSAT's orbital projection; wherein said TPD comprises a radio and a ground station; wherein the Computational Cloud commands the radio to communicate with the LEOSAT; and wherein said LEOSAT comprises a satellite and a radio antenna; (b) providing a Computational Cloud that is connected to at least one TPD via the Internet, comprising: i) a Module 1, comprising an Ephemeris Software Module and a database of calculated and stored data regarding the LEOSAT's predicted orbital position with respect to time and geographic locations; ii) a Module 2, comprising a TPD Registry Module; iii) a Module 3, comprising a TPD Communications Profile Planning Software Module; wherein Module 3 is capable of issuing TPD Issued Temporal Control, Communications, and Instrumentation Profile (ITCCIP) for each TPD on a time-slot-by-time-slot-basis; wherein said ITCCIP is further comprised of Radio Communications Parameters (RCPs) and basic Instrumentation Parameters (IMPs); iv) a Module 4, comprising an Internet Communications Software Module, wherein Module 4 facilitates all Internet communication between said Module 3 and said TPD; v) a Module 5, comprising a Multi-Satellite Radio Path Predictor Module; wherein Module 5 stores and contains a three dimensional data representation of said LEOSAT's static radio antenna pattern; wherein Module 5 is capable of predicting how said LEOSAT's three dimensional radio antenna pattern projection will impinge a selected geographical location and the time at which the impingement will be made; vi) a Module 6, comprising a Message/TPD Apportionment Module; wherein Module 6 supports said Module 3 by allowing messages to be communicated to be fragmented and apportioned to the appropriate TPD; vii) a Module 7, comprising a Composite Pre-Tuned Instrument Module, and wherein Modules 3, 4, and 7 provide IMP functionality; viii) a Module 8, comprising a Mobile Control Module, wherein Module 8 controls TPD mobility; wherein at least one TPD is connected to the Computational Cloud via the Internet; wherein said Module 1 provides its current and predicted LEOSAT location data to Module 3; wherein said Module 2 provides registry data and TPD location data to Module 3; and wherein said Module 4 serves as the Internet interface function between Module 2 and said TPD having Internet connectivity with Module 4.

28. The method of claim 27, wherein Module 2 comprises a TPD database containing the geographical coordinates stationary location of each TPD.

29. The method of claim 27, wherein RCPs are sent to each TPD from the Computational Cloud to control which TPD transmits and which TPD listens during each time slot.

30. The method of claim 27, wherein Module 5 generates its SRPSTPs through a method comprising:
   (a) Module 5 receives the TPD location and measurement data from the TPDs under IMP control;
   (b) each said parallel simulation instances considers how the simulated LEOSAT's communications will impinge and align at actual locations of TPDs, calculating the likely simulated time-stamped signal levels received at TPDs from the simulated LEOSAT;
   (c) for each parallel simulation instance, compare said simulated measurements to the actual measurements reported by the TPDs under IMP instruction;
   (d) selecting the simulation instance that bears the closest correlation between its simulated time-stamped predicted measurements and the actual time-stamped measurements is the simulation to be taken as the best predictor of the actual LEOSAT; and
   (e) reporting the prediction data to Module 3.

31. The method of claim 27, wherein Module 6 performs fragmenting and apportionment through a method comprising:
   (a) generating a message for transmitting from the LEOSAT by transmitting TPDs;
   (b) fragmenting of the message into two or more data packets;
   (c) apportioning the data packets comprising the message to be sent to the TPD units predicted to have the best signal quality with said LEOSAT radio antenna pattern alignment at a particular time slot;
   (d) sequentially numbering the data packets;
   (e) transmitting said data packets by the transmitting TPDs to the LEOSAT;
   (f) transmitting said data packets by the LEOSAT to the receiving TPDs;
   (g) forwarding of said data packets received by receiving TPDs to the Computational Cloud;
   (h) receiving said data packets by the Computational Cloud;
   (i) reassembly of the message using the sequential numbering; and
   (j) transmitting the completed message.

32. The method of claim 31, wherein the receiving TPDs transmit said data packets to other TPDs.

33. The method of claim 32, wherein Module 6 controls the data packet size based upon the predicted satellite spin rate and impingement time at TPDs of the LEOSAT.

34. The method of claim 27, wherein Modules 6, 3, and 4 and the PTDs perform Computationally Augmented Random Linear Network Coding.

* * * * *